(12) United States Patent
Zhang

(10) Patent No.: US 12,501,406 B2
(45) Date of Patent: Dec. 16, 2025

(54) METHOD AND DEVICE FOR SIDELINK RELAY WIRELESS COMMUNICATION

(71) Applicant: BUNKER HILL TECHNOLOGIES LLC, Allen, TX (US)

(72) Inventor: Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 421 days.

(21) Appl. No.: 18/096,572

(22) Filed: Jan. 13, 2023

(65) Prior Publication Data

US 2023/0180190 A1     Jun. 8, 2023

Related U.S. Application Data

(63) Continuation of application No. PCT/CN2021/101196, filed on Jun. 21, 2021.

(30) Foreign Application Priority Data

Jul. 14, 2020 (CN) .......................... 202010673056.9
Jul. 17, 2020 (CN) .......................... 202010694218.7
Jul. 20, 2020 (CN) .......................... 202010696182.6

(51) Int. Cl.
*H04W 72/02* (2009.01)
*H04W 72/0446* (2023.01)
*H04W 80/02* (2009.01)

(52) U.S. Cl.
CPC ....... *H04W 72/02* (2013.01); *H04W 72/0446* (2013.01); *H04W 80/02* (2013.01)

(58) Field of Classification Search
CPC .. H04W 72/02; H04W 72/0446; H04W 80/02
See application file for complete search history.

(56) References Cited

U.S. PATENT DOCUMENTS 10,390,256 B2   8/2019   Saiwai et al.
11,533,745 B2 * 12/2022  Hong .................... H04L 1/0041
(Continued)

FOREIGN PATENT DOCUMENTS

CN       110463339 A      11/2019
CN       110650550 A       1/2020
(Continued)

OTHER PUBLICATIONS

First Office Action of Chinese patent application No. CN202010696182.6 dated Nov. 1, 2023.
(Continued)

*Primary Examiner* — Michael Thier
*Assistant Examiner* — Nevena Zecevic Sandhu
(74) *Attorney, Agent, or Firm* — Ascenda Law Group, PC

(57) ABSTRACT

The present application provides a method and a device for sidelink relay wireless communications. A first node transmits first assistance information, the first assistance information indicating a transmission state of a first channel; and receives first configuration information, the first configuration information indicating a first time length; and receives a first MAC PDU, the first MAC PDU comprising a first MAC SDU; and selects a first time unit from a first time resource pool; and transmits a second MAC PDU in the first time unit; herein, the first assistance information is used for generating the first configuration information, and the second MAC PDU comprises at least partial bits in the first MAC SDU; the first channel connects the first node to a target receiver receiving the second MAC PDU. The present application addresses the delay coordination of relay transmission.

14 Claims, 9 Drawing Sheets

(56) References Cited

U.S. PATENT DOCUMENTS

| | | | |
|---|---|---|---|
| 2011/0002311 A1* | 1/2011 | Wang | H04L 47/34 370/336 |
| 2014/0140531 A1* | 5/2014 | Lee | H04N 13/341 381/81 |
| 2014/0254393 A1* | 9/2014 | Yi | H04L 1/1896 370/242 |
| 2018/0054755 A1* | 2/2018 | Lee | H04W 72/21 |
| 2020/0059915 A1 | 2/2020 | Lee | |
| 2020/0145876 A1* | 5/2020 | Dao | H04L 12/1407 |
| 2021/0167928 A1* | 6/2021 | Xiao | H04L 1/1896 |
| 2021/0297300 A1* | 9/2021 | Zhang | H04L 27/2626 |
| 2023/0231654 A1* | 7/2023 | Ganesan | H04L 5/0044 370/329 |

FOREIGN PATENT DOCUMENTS

| | | | |
|---|---|---|---|
| CN | 110679190 A | 1/2020 | |
| CN | 110838898 A | 2/2020 | |
| CN | 111345100 A | 6/2020 | |
| CN | 111901847 A | 11/2020 | |

OTHER PUBLICATIONS

First Search Report of Chinese patent application No. CN202010696182.6 dated Oct. 27, 2023.

Second Office Action of Chinese patent application No. CN202010696182.6 dated Feb. 3, 2024.

ISR received in application No. PCT/CN2021/101196 dated Sep. 2, 2021.

First Office Action of Chinses patent application No. CN202010694218.7 dated Jun. 2, 2022.

First Search Report of Chinses patent application No. CN202010694218.7 dated May 26, 2022.

Second Office Action of Chinses patent application No. CN202010694218.7 dated Oct. 12, 2022.

NTT Docomo Remaining Issues on Resource Allocation for UE-to-Network Relay 3GPP TSG RAN WG1 Meeting #82 R1-154646 Aug. 14, 2015.

Intel Corporation Sidelink Resource Allocation and Configuration for Wearable and IoT Use Cases 3GPP TSG RAN WG1 Meeting #89 R1-1707333 May 7, 2017.

* cited by examiner

METHOD AND DEVICE FOR SIDELINK RELAY WIRELESS COMMUNICATION

CROSS REFERENCE TO RELATED APPLICATIONS

This application is the continuation of the International patent application No. PCT/CN2021/101196, filed on Jun. 21, 2021, claims the priority benefit of Chinese Patent Application No. 202010673056.9, filed on Jul. 14, 2020, and claims the priority benefit of Chinese Patent Application No. 202010694218.7, filed on Jul. 17, 2020; and claims the priority benefit of Chinese Patent Application No. 202010696182.6, filed on Jul. 20, 2020, the full disclosure of which is incorporated herein by reference.

BACKGROUND

Technical Field

The present application relates to methods and devices in wireless communication systems, and in particular to a method and device supporting relay transmission in wireless communications in the sidelink.

Related Art

As a multi-hop transmission technology, Relay is aimed at increasing cell-edge throughput and cell coverage. Take Sidelink (SL) transmission in a Long Term Evolution (LTE) system as an example, a transmission from a User Equipment (UE) to a relay node (RN) adopts SL Radio technique, while a transmission from an RN to a base station (that is, eNodeB, eNB) adopts LTE Radio technique. The RN being used for data forwarding between the UE and the eNB is also called Internet Protocol (IP) layer forwarding or Layer 3 Relay/L3 Relay.

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 Plenary to standardize the NR. In response to a rapid growth of Vehicle-to-Everything (V2X) services, the 3GPP has kicked off standard setting and studies under the framework of NR. A decision was made at the 3GPP RAN #86 Plenary that a Study Item (SI) was to be started to standardize NR Sidelink (SL) Relay.

SUMMARY

Inventors find through researches that the NR V2X is supportive to plenty of application scenarios, and the request for the Quality of Service (QoS) varies from one service to another. Such QoS requests will be defined by different groups of QoS parameters, where the QoS parameters include but are not limited to one or more of PC5 5G QoS Identifier (PQI), PC5 Flow bit rate, PC5 Link Aggregated Bit Rate or Range. Herein, the PQI parameter is mapped to QoS properties at the Tx UE side, among which there is one QoS property being a Packet Delay Budget, namely, a transmission delay of a packet in a traffic flow shall not go beyond the Packet Delay Budget. In relay transmissions, thanks to the introduction of a relay node, the original single-hop transmission from a Tx UE to a Rx UE is enabled to complete in two hops, namely, from a Tx UE to a relay node and from the relay node to a Rx UE, in this regard, it will be necessary to study how to assign a target Packet Delay Budget between the two-hop transmission rationally to meet the requirement of transmission delay for traffic flows.

To address the above problem, the present application provides a solution. In the description above in the present application, the scenario of NR V2X is only presented as a typical application scenario or example; the present application is also applicable to scenarios other than NR V2X that confront similar issue, for instance, the relay network, the Device-to-Device (D2D) network, the cellular network and scenarios supporting Half-Duplex UE, where technical effects similar to those in NR V2X can be achieved. Additionally, the adoption of a unified solution for various scenarios, including but not limited to NR V2X scenarios and downlink communication scenarios, contributes to the reduction of hardcore complexity and costs. In the case of no conflict, the embodiments of a first node and the characteristics in the embodiments may be applied to any other node, and vice versa. What's more, the embodiments in the present application and the characteristics in the embodiments can be arbitrarily combined if there is no conflict. Particularly, for interpretations of the terminology, nouns, functions and variables (unless otherwise specified) in the present application, refer to definitions given in TS36 series, TS38 series and TS37 series of 3GPP specifications.

The present application provides a method in a first node for wireless communications, comprising:
- transmitting first assistance information, the first assistance information indicating a transmission state of a first channel; and
- receiving first configuration information, the first configuration information indicating a first time length; and receiving a first MAC PDU, the first MAC PDU comprising a first MAC subPDU, the first MAC subPDU comprising a first MAC SDU; selecting a first time unit from a first time resource pool; and
- transmitting a second MAC PDU in the first time unit;
- herein, the first assistance information is used for generating the first configuration information, and the second MAC PDU comprises at least partial bits in the first MAC SDU; the first channel connects the first node to a target receiver receiving the second MAC PDU; a second channel connects a transmitter transmitting the first MAC PDU to the first node; the transmitter transmitting the first MAC PDU and the target receiver receiving the second MAC PDU are Non-Co-located; the first time length is used to determine the first time resource pool.

In one embodiment, the present application is applicable to scenarios with relay transmissions in the sidelink.

In one embodiment, the present application is applicable to sensing-based resource allocating modes in sidelink transmissions.

In one embodiment, the present application is applicable to dynamic grant-based resource allocating modes in sidelink transmissions.

In one embodiment, a problem to be solved in the present application is: a target time length is assigned between the first node and the second node, where the second node is a Tx UE and the first node is a relay node.

In one embodiment, a solution given in the present application includes: the first node measures a transmission state of a first channel and then reports the transmission state to the second node, the second node determines a first time length according to the first channel's transmission state, and reconfigures the first channel, and the first node transmits packets transmitted through the first channel based on the first time length upon updating.

In one embodiment, a beneficial effect of the present application includes: a target time length is divided into 2 time lengths, which are respectively used for a second channel and a first channel, enabling packets of the same traffic flow to acquire equivalent performances after being transmitted through the second channel and the first channel, thus reducing the packet loss rate.

According to one aspect of the present application, comprising:
determining the first time resource pool in a lower layer according to the first time length; where a time length of the first time resource pool is no greater than the first time length; and reporting the first time resource pool to a higher layer of the first node.

According to one aspect of the present application, comprising:
a time interval from a last time unit in the first time resource pool to a time of receiving the first MAC SDU does not exceed the first time length.

According to one aspect of the present application, comprising:
a target time length being determined, and a first threshold being received; where a difference between the transmission state of the first channel and a transmission state of the second channel is no smaller than the first threshold; the first time length is no greater than the target time length.

According to one aspect of the present application, comprising:
a delay after the first MAC SDU being transmitted through the second channel and the first channel being no greater than the target time length.

According to one aspect of the present application, comprising:
the first time unit being any time unit in the first time resource pool;
herein, the first time resource pool comprises at least one time unit.

The present application provides a method in a second node for wireless communications, comprising:
receiving first assistance information, the first assistance information used for indicating a transmission state of a first channel; and
transmitting first configuration information, the first configuration information indicating a first time length; and transmitting a first MAC PDU, the first MAC PDU comprising a first MAC subPDU, the first MAC subPDU comprising a first MAC SDU;
herein, a first time unit is selected from a first time resource pool; a second MAC PDU is transmitted in the first time unit; the first assistance information is used for generating the first configuration information, the second MAC PDU comprising at least partial bits in the first MAC SDU; the first channel connects the first node to a target receiver receiving the second MAC PDU; a second channel connects a transmitter transmitting the first MAC PDU to the first node; the transmitter transmitting the first MAC PDU and the target receiver receiving the second MAC PDU are Non-Co-located; the first time length is used to determine the first time resource pool.

According to one aspect of the present application, comprising:
the first time resource pool being determined in a lower layer according to the first time length; where a time length of the first time resource pool is no greater than the first time length; and the first time resource pool being reported to a higher layer of the first node.

According to one aspect of the present application, comprising:
a time interval from a last time unit in the first time resource pool to a time of receiving the first MAC SDU does not exceed the first time length.

According to one aspect of the present application, comprising:
determining a target time length, and receiving a first threshold;
where a difference between the transmission state of the first channel and a transmission state of the second channel is no smaller than the first threshold; the first time length is no greater than the target time length.

According to one aspect of the present application, comprising:
a delay after the first MAC SDU being transmitted through the second channel and the first channel being no greater than the target time length.

According to one aspect of the present application, comprising:
the first time unit being any time unit in the first time resource pool;
herein, the first time resource pool comprises at least one time unit.

The present application provides a first node for wireless communications, comprising:
a first transmitter, transmitting first assistance information, the first assistance information indicating a transmission state of a first channel; and
a first receiver, receiving first configuration information, the first configuration information indicating a first time length; receiving a first MAC PDU, the first MAC PDU comprising a first MAC subPDU, the first MAC subPDU comprising a first MAC SDU; selecting a first time unit from a first time resource pool; and
the first transmitter, transmitting a second MAC PDU in the first time unit;
herein, the first assistance information is used for generating the first configuration information, and the second MAC PDU comprises at least partial bits in the first MAC SDU; the first channel connects the first node to a target receiver receiving the second MAC PDU; a second channel connects a transmitter transmitting the first MAC PDU to the first node; the transmitter transmitting the first MAC PDU and the target receiver receiving the second MAC PDU are Non-Co-located; the first time length is used to determine the first time resource pool.

The present application provides a second node for wireless communications, comprising:
a second receiver, receiving first assistance information, the first assistance information being used for indicating a transmission state of a first channel; and
a second transmitter, transmitting first configuration information, the first configuration information indicating a first time length; and transmitting a first MAC PDU, the first MAC PDU comprising a first MAC subPDU, the first MAC subPDU comprising a first MAC SDU;
herein, a first time unit is selected from a first time resource pool; a second MAC PDU is transmitted in the first time unit; the first assistance information is used for generating the first configuration information, the second MAC PDU comprising at least partial bits in the first MAC SDU; the first channel connects the first node to a target receiver receiving the second MAC PDU; a second channel connects a transmitter transmitting the first MAC PDU to the first node; the transmitter transmitting the first MAC PDU and the target receiver receiving the second MAC PDU are Non-Co-located; the first time length is used to determine the first time resource pool.

The present application provides a method in a first node for wireless communications, comprising:
  receiving a first MAC PDU in a first time unit;
  selecting a second time unit from a second time resource pool; and transmitting a second MAC PDU in the second time unit;
  herein, the first MAC PDU comprises a first MAC subPDU, the first MAC subPDU comprising a first MAC subheader and a first MAC SDU; the first MAC subheader indicates a first time length; the first time length is used to determine the second time resource pool; the second MAC PDU comprises at least partial bits in the first MAC SDU; the first time length is dependent on a position of the first time unit.

In one embodiment, the present application is applicable to scenarios with relay transmissions in the sidelink.

In one embodiment, the present application is applicable to channel sensing-based resource allocating modes in sidelink transmissions.

In one embodiment, a problem to be solved in the present application is: a target time length is assigned between the first node and the second node, where the second node is a Tx UE and the first node is a relay node.

In one embodiment, a solution given in the present application includes: the second node carries remaining transmission time of a first MAC SDU in the first node when transmitting the first MAC SDU to the first node, the remaining transmission time being used by the first node to determine a second time unit forwarded by the first MAC SDU in the first node.

In one embodiment, a beneficial effect of the present application includes: determining remaining transmission time of the first MAC SDU in the first node according to an actual time for transmitting the first MAC SDU in the second node, which dynamically adjusts the remaining transmission time of the first MAC SDU in the first node, and optimizes the selection of resources for transmitting the first MAC SDU in the first node, thus increasing the success rate of transmission and reducing interference to the system.

According to one aspect of the present application, comprising:
  the first time unit being selected from a first time resource pool; a sum of a duration of the first time resource pool and a duration of the second time resource pool does not exceed a target time length, the target time length being determined by a transmitter transmitting the first MAC SDU.

According to one aspect of the present application, comprising:
  a sum of the first time length and a time interval from the first time unit to a time of generating the first MAC SDU is no greater than the target time length.

According to one aspect of the present application, comprising:
  determining the second time resource pool in a lower layer according to the first time length; and reporting the second time resource pool to a higher layer of the first node.

According to one aspect of the present application, comprising:
  a time interval from a last time unit in the second time resource pool to a time of receiving the first MAC SDU does not exceed the first time length.

According to one aspect of the present application, comprising:
  a first channel connects a transmitter transmitting the first MAC PDU to the first node; the second channel connects the first node to a target receiver receiving the second MAC PDU; the transmitter transmitting the first MAC PDU and the target receiver receiving the second MAC PDU are Non-Co-located.

The present application provides a method in a second node for wireless communications, comprising:
  transmitting a first MAC PDU in a first time unit;
  herein, the first MAC PDU comprises a first MAC subPDU, the first MAC subPDU comprising a first MAC subheader and a first MAC SDU; the first MAC subheader indicates a first time length; the first time length is used to determine a second time resource pool; a second MAC PDU is transmitted in a second time unit, the second time unit being selected from the second time resource pool; the second MAC PDU comprises at least partial bits in the first MAC SDU; the first time length is dependent on a position of the first time unit.

According to one aspect of the present application, comprising:
  selecting the first time unit from a first time resource pool;
  herein, a sum of a duration of the first time resource pool and a duration of the second time resource pool does not exceed a target time length, the target time length being determined in the second node.

According to one aspect of the present application, comprising:
  a sum of the first time length and a time interval from the first time unit to a time of generating the first MAC SDU is no greater than the target time length.

According to one aspect of the present application, comprising:
  the second time resource pool being determined in a lower layer according to the first time length; and the second time resource pool being reported to a higher layer of the first node.

According to one aspect of the present application, comprising:
  a time interval from a last time unit in the second time resource pool to a time of receiving the first MAC SDU does not exceed the first time length.

According to one aspect of the present application, comprising:
  a first channel connects a transmitter transmitting the first MAC PDU to the first node; the second channel connects the first node to a target receiver receiving the second MAC PDU; the transmitter transmitting the first MAC PDU and the target receiver receiving the second MAC PDU are Non-Co-located.

The present application provides a first node for wireless communications, comprising:
  a first receiver, receiving a first MAC PDU in a first time unit; and
  a first transmitter, selecting a second time unit from a second time resource pool; and transmitting a second MAC PDU in the second time unit;

herein, the first MAC PDU comprises a first MAC sub-PDU, the first MAC subPDU comprising a first MAC subheader and a first MAC SDU; the first MAC subheader indicates a first time length; the first time length is used to determine the second time resource pool; the second MAC PDU comprises at least partial bits in the first MAC SDU; the first time length is dependent on a position of the first time unit.

The present application provides a second node for wireless communications, comprising:

a second transmitter, transmitting a first MAC PDU in a first time unit;

herein, the first MAC PDU comprises a first MAC sub-PDU, the first MAC subPDU comprising a first MAC subheader and a first MAC SDU; the first MAC subheader indicates a first time length; the first time length is used to determine a second time resource pool; a second MAC PDU is transmitted in a second time unit, the second time unit being selected from the second time resource pool; the second MAC PDU comprises at least partial bits in the first MAC SDU; the first time length is dependent on a position of the first time unit.

In one embodiment, the method provided in the present application has the following advantages:

the present application is applicable to sensing-based resource allocation mode in the sidelink transmission, as well as the resource allocation mode based on dynamic scheduling;

the issue in the present application is that for relay transmission, a target time length is rationally assigned between a transmitting node and a relay node;

with the method provided in the present application, a relay node measures the transmission state of a first channel and reports the transmission state back to a transmitting node, then the transmitting node determines a first time length based on the transmission state of the first channel and reconfigures the first channel, and the relay node processes by transmitting packets having been through the first channel with a first time length that has been updated;

with the method provided in the present application, a target time length is divided into two time lengths, which are respectively used for a second channel and a first channel, enabling packets of the same traffic flow to acquire equivalent performances after being transmitted through the second channel and the first channel, thus reducing the packet loss rate.

In one embodiment, the method provided in the present application has the following advantages:

the present application is applicable to channel sensing-based resource allocation mode in the sidelink transmission;

the issue in the present application is that for relay transmission, a target time length is rationally assigned between a transmitting node and a relay node;

with the method provided in the present application, a Tx UE carries remaining transmission time of the first MAC SDU in a relay node when transmitting a packet to the relay node, the remaining transmission time being used by the relay node to determine a time unit forwarded by the packet in the relay node;

with the method provided in the present application, by determining remaining transmission time of a packet in a relay node according to an actual time for transmitting the packet by a Tx UE, the remaining transmission time of the packet in the relay node can be adjusted dynamically, which can optimize the pool of resources for transmitting the packet in the relay node, thereby enhancing the transmission success rate and lowering the system interference.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1A

Figure 1A:
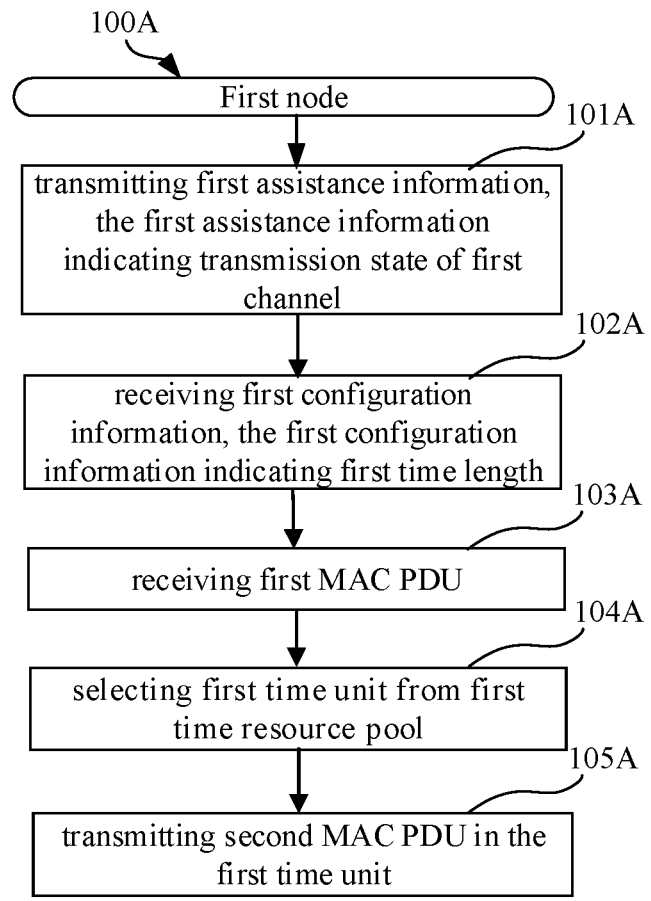
FIG. 1A illustrates a flowchart of first assistance information, first configuration information, a first MAC PDU, a first time unit and a second MAC PDU according to one embodiment of the present application.

Embodiment 1A illustrates a flowchart of first assistance information, first configuration information, a first MAC PDU, a first time unit and a second MAC PDU according to one embodiment of the present application, as shown in FIG. 1A.

In Embodiment 1A, a first node 100A in the present application transmits first assistance information in step 101A, the first assistance information indicating a transmission state of a first channel; receives first configuration information in step 102A, the first configuration information indicating a first time length; and receives a first MAC PDU in step 103A, the first MAC PDU comprising a first MAC subPDU, the first MAC subPDU comprising a first MAC SDU; selects a first time unit from a first time resource pool in step 104A; and transmits a second MAC PDU in the first time unit in step 105A; herein, the first assistance information is used for generating the first configuration information, and the second MAC PDU comprises at least partial bits in the first MAC SDU; the first channel connects the first node to a target receiver receiving the second MAC PDU; a second channel connects a transmitter transmitting the first MAC PDU to the first node; the transmitter transmitting the first MAC PDU and the target receiver receiving the second MAC PDU are Non-Co-located; the first time length is used to determine the first time resource pool.

In one embodiment, a target receiver of the first assistance information is the second node in the present application.

In one embodiment, the first assistance information is Radio Resource Control (RRC) layer information.

In one embodiment, the first assistance information is Media Access Control (MAC) layer information.

In one embodiment, the first assistance information is transmitted via a PC5 interface.

In one embodiment, the first assistance information is transmitted in a sidelink.

In one embodiment, the first assistance information is higher-layer information above the RRC layer.

In one embodiment, the first assistance information comprises all or part of Information Elements (IEs) in an RRC signaling.

In one embodiment, the first assistance information comprises an SL-UEAssistanceInformation signaling.

In one embodiment, the first assistance information comprises an SL-UEAssistanceInformation IE in an RRC signaling.

In one embodiment, the first assistance information comprises an SL-UEAssistanceInformationNR IE in an RRC signaling.

In one embodiment, the first assistance information comprises all or partial fields in an IE in an RRC signaling.

In one embodiment, the first assistance information is transmitted through a Sidelink Shared Channel (SL-SCH).

In one embodiment, the first assistance information is transmitted through a Media Access Control Control Element (MAC CE).

In one embodiment, the first assistance information is transmitted through a Physical Sidelink Shared Channel (PSSCH).

In one embodiment, the first assistance information is unicast.

In one embodiment, the first assistance information is groupcast.

In one embodiment, the transmission state of the first channel indicates the transmission performance of the first channel.

In one embodiment, the first assistance information comprises a Relay Node-Channel Occupancy Ratio (RN-CR), the RN-CR indicating the transmission state of the first channel.

In one embodiment, the first assistance information comprises a RN-PacketLossRate, the RN-PacketLossRate indicating the transmission state of the first channel.

In one embodiment, the first assistance information comprises a RN-ARQ-PacketLossRate, the RN-ARQ-PacketLossRate indicating the transmission state of the first channel.

In one embodiment, the first assistance information comprises a RN-HARQ-PacketLossRate, the RN-HARQ-PacketLossRate indicating the transmission state of the first channel.

In one embodiment, the first assistance information comprises a RN-ARQ-PacketSuccessRate, the RN-ARQ-PacketSuccessRate indicating the transmission state of the first channel.

In one embodiment, the first assistance information comprises a RN-HARQ-PacketSuccessRate, the RN-HARQ-PacketSuccessRate indicating the transmission state of the first channel.

In one embodiment, the first assistance information comprises a RN-DTX-rate, the RN-DTX-rate indicating the transmission state of the first channel.

In one embodiment, the first assistance information comprises a RN-AverageResourceSelection, the RN-AverageResourceSelection indicating the transmission state of the first channel.

In one embodiment, as a response to the first assistance information, the second node transmits the first configuration information.

In one embodiment, the first configuration information is an RRCReconfigurationSidelink message.

In one embodiment, as a response to the first configuration information, the first node transmits an RRCReconfigurationCompleteSidelink message.

In one embodiment, the first configuration information is transmitted via a PC5 interface.

In one embodiment, the first configuration information is transmitted in sidelink.

In one embodiment, the first configuration information comprises all or part of a higher layer signaling.

In one embodiment, the first configuration information comprises all or part of a physical layer signaling.

In one embodiment, the first configuration information is RRC layer information.

In one embodiment, the first configuration information is MAC layer information.

In one embodiment, the first configuration information is higher-layer information above the RRC layer.

In one embodiment, the first configuration information is V2X layer information.

In one embodiment, the first configuration information is PC5-signaling (PC5-S) information.

In one embodiment, the first configuration information comprises all or partial IEs in a PC5-S signaling.

In one embodiment, the first configuration information comprises all or partial IEs in an RRC signaling.

In one embodiment, the first configuration information comprises all or partial fields in an IE in an RRC signaling.

In one embodiment, the first configuration information comprises an RRCReconfigurationSidelink signaling.

In one embodiment, the first configuration information comprises all or partial IEs in an RRCReconfigurationSidelink signaling.

In one embodiment, the first configuration information comprises all or partial fields in an IE in an RRCReconfigurationSidelink signaling.

In one embodiment, the first configuration information is transmitted through a SL-SCH.

In one embodiment, the first configuration information is transmitted through a PSSCH.

In one embodiment, the first configuration information is unicast.

In one embodiment, the first configuration information is groupcast.

In one embodiment, the first time length is measured in slots.

In one embodiment, the first time length is measured in subframes.

In one embodiment, the first time length is measured in milliseconds (ms).

In one embodiment, the first time length comprises a positive integer number of slot(s).

In one embodiment, the first time length comprises a positive integer number of sidelink slot(s).

In one embodiment, the first time length comprises a positive integer number of sub-frame(s).

In one embodiment, the first time length comprises a positive integer number of sidelink sub-frame(s).

In one embodiment, the first configuration information comprises an SL-RN-PDB, the SL-RN-PDB being the first time length, the first configuration information explicitly indicating the first time length.

In one embodiment, the first configuration information comprises an SL-RN-deltaPDB, the SL-RN-deltaPDB being a first delay increment, the first configuration information implicitly indicating the first time length.

In one embodiment, the first configuration information comprises an SL-RN-deltaPDBindex, the SL-RN-deltaPDBindex being a first delay increment index, the first configuration information implicitly indicating the first time length.

In one embodiment, the first configuration information comprises an SL-RN-PDBIncreaseorDecrease, the SL-RN-PDBIncreaseorDecrease being an indication of Increase or Decrease, the first configuration information implicitly indicating the first time length.

In one embodiment, the first delay increment is a delay increment in a delay increment list.

In one embodiment, the first delay increment is determined by UE implementation.

In one embodiment, an absolute value of the first delay increment is no greater than the first target delay length.

In one embodiment, the first delay increment index indicates a delay increment in a delay increment list.

In one embodiment, the indication of Increase or Decrease refers to increase.

In one embodiment, the indication of Increase or Decrease refers to decrease.

In one embodiment, the indication of Increase or Decrease refers to neither increase nor decrease.

In one embodiment, a transmitter of the first MAC Protocol Data Unit (PDU) is the second node in the present application.

In one embodiment, the first MAC PDU and the second MAC PDU are respectively transmitted on PSSCHs.

In one embodiment, the first MAC PDU comprises a first SL-SCH subheader and K1 MAC subPDUs, where the K1 MAC subPDUs include the first MAC subPDU, K1 being a positive integer.

In one embodiment, the first MAC subPDU comprises a first MAC subheader and the first Media Access Control Service Data Unit (MAC SDU).

In one embodiment, the first MAC SDU is transmitted on an SL-SCH.

In one embodiment, the first MAC SDU is transmitted in a second channel.

In one embodiment, a target receiver of the second MAC PDU is the other UE in the present application.

In one embodiment, the second MAC PDU comprises a second SL-SCH subheader and K2 MAC subPDUs, where the K2 MAC subPDUs include the second MAC subPDU, K2 being a positive integer.

In one embodiment, the second MAC subPDU comprises a second MAC subheader and a second MAC SDU.

In one embodiment, the second MAC SDU comprises partial bits in the first MAC SDU.

In one embodiment, the second MAC SDU comprises all bits in the first MAC SDU.

In one embodiment, the first MAC PDU is used for generating the second MAC PDU.

In one embodiment, the first MAC subPDU and the second MAC subPDU have the same bits except for a different LCID.

In one embodiment, bits in the first MAC subPDU and bits in the second MAC subPDU are the same.

In one embodiment, partial bits in the first MAC SDU are transmitted in the second MAC PDU.

In one embodiment, all bits in the first MAC SDU are transmitted in the second MAC PDU.

In one embodiment, the second MAC SDU is transmitted on an SL-SCH.

In one embodiment, the second MAC SDU is transmitted in the first channel.

In one embodiment, the first time resource pool comprises a positive integer number of sidelink slot(s).

In one embodiment, the first time unit comprises one sidelink slot.

In one embodiment, the first time unit comprises M sidelink slot(s), where M is a positive integer.

In one embodiment, M is any value of 1, or 2 or 3.

In one embodiment, when M is greater than 1, any two adjacent sidelink slots among the M sidelink slots are spaced by X sidelink slot(s), where X is a natural number.

In one embodiment, X is less than 16.

In one embodiment, X is less than 32.

In one embodiment, the action of selecting a first time unit from a first time resource pool is performed in a higher layer.

In one embodiment, the action of selecting a first time unit from a first time resource pool is performed in a lower layer.

In one embodiment, the first time resource pool is determined in a lower layer.

In one embodiment, the higher layer includes the L2 layer; the lower layer includes the L1 layer.

In one embodiment, the higher layer includes the MAC layer; the lower layer includes the physical layer.

In one embodiment, the phrase that the first assistance information is used for generating the first configuration information comprises: the transmission state of the first channel carried by the first assistance information triggers generation of the first configuration information, the first configuration information indicating the first time length.

In one embodiment, the first channel is a Radio Bearer (RB) established between the first node and a target receiver of the second MAC PDU.

In one embodiment, the first channel is a direct communication channel established between the first node and the target receiver of the second MAC PDU.

In one embodiment, the second channel is an RB established between a transmitter of the first MAC PDU and the first node.

In one embodiment, the second channel is a direct communication channel established between the transmitter of the first MAC PDU and the first node.

In one embodiment, the transmitter of the first MAC PDU and the target receiver of the second MAC PDU are two communication nodes that are non-Co-located.

In one embodiment, a Source Layer 2 ID of the transmitter of the first MAC PDU is different from a source Layer 2 ID of the target receiver of the second MAC PDU.

In one embodiment, an IP address of the transmitter of the first MAC PDU is different from an IP address of the target receiver of the second MAC PDU.

In one embodiment, the first time length is used to determine the first time resource pool in a lower layer.

Embodiment 1B

Figure 1B:
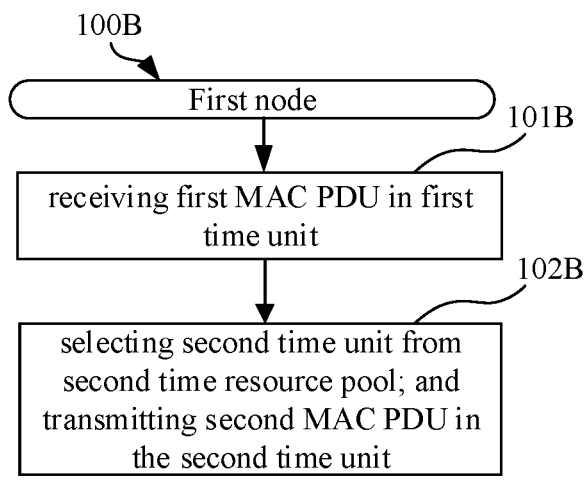
FIG. 1B illustrates a flowchart of a first time unit, a first MAC PDU, a second time resource pool, a second time unit and a second MAC PDU according to one embodiment of the present application.

Embodiment 1B illustrates a flowchart of a first time unit, a first MAC PDU, a second time resource pool, a second time unit and a second MAC PDU according to one embodiment of the present application, as shown in FIG. 1B.

In Embodiment 1B, a first node 100B in the present application receives a first MAC PDU in a first time unit in step 101B; selects a second time unit from a second time resource pool in step 102B; and transmits a second MAC PDU in the second time unit; herein, the first MAC PDU comprises a first MAC subPDU, the first MAC subPDU comprising a first MAC subheader and a first MAC SDU; the first MAC subheader indicates a first time length; the first time length is used to determine the second time resource pool; the second MAC PDU comprises at least partial bits in the first MAC SDU; the first time length is dependent on a position of the first time unit.

In one embodiment, the first time unit comprises one slot.

In one embodiment, the first time unit comprises one sidelink slot.

In one embodiment, the first time unit comprises one mini-slot.

In one embodiment, the first time unit comprises one subframe.

In one embodiment, the second time unit comprises one slot.

In one embodiment, the second time unit comprises one sidelink slot.

In one embodiment, the second time unit comprises one mini-slot.

In one embodiment, the second time unit comprises one subframe.

In one embodiment, a transmitter of the first Media Access Control (MAC) Protocol Data Unit (PDU) is the second node in the present application.

In one embodiment, the first MAC PDU comprises a first Sidelink Shared Channel (SL-SCH) subheader and K1 MAC subPDUs, where the K1 MAC subPDUs include the first MAC subPDU, K1 being a positive integer.

In one embodiment, the first MAC subPDU comprises a first MAC subheader and a first Media Access Control Service Data Unit (MAC SDU).

In one embodiment, a target receiver of the second MAC PDU is another UE in the present application.

In one embodiment, the second MAC PDU comprises a second SL-SCH subheader and K2 MAC subPDUs, where the K2 MAC subPDUs include the second MAC subPDU, K2 being a positive integer.

In one embodiment, the second MAC subPDU comprises a second MAC subheader and a second MAC SDU.

In one embodiment, the second MAC SDU comprises partial bits in the first MAC SDU.

In one embodiment, the second MAC SDU comprises all bits in the first MAC SDU.

In one embodiment, the first MAC PDU is used for generating the second MAC PDU.

In one embodiment, the first MAC subPDU and the second MAC subPDU have the same bits except for a different Logical Channel Identifier (LCID).

In one embodiment, bits in the first MAC subPDU and bits in the second MAC subPDU are the same.

In one embodiment, partial bits in the first MAC SDU are transmitted in the second MAC PDU.

In one embodiment, all bits in the first MAC SDU are transmitted in the second MAC PDU.

In one embodiment, the first MAC SDU and the second MAC SDU are respectively transmitted on SL-SCHs.

In one embodiment, the first MAC PDU and the second MAC PDU are respectively transmitted on a Physical Sidelink Shared CHannel (PSSCH).

In one embodiment, the first time length is measured in slots.

In one embodiment, the first time length is measured in subframes.

In one embodiment, the first time length is measured in milliseconds (ms).

In one embodiment, the first time length comprises a positive integer number of slot(s).

In one embodiment, the first time length comprises a positive integer number of sidelink slot(s).

In one embodiment, the first time length comprises a positive integer number of sub-frame(s).

In one embodiment, the first time length comprises a positive integer number of sidelink sub-frame(s).

In one embodiment, the first MAC subheader comprises the first time length.

In one embodiment, the first MAC subheader comprises a first time length index, the first time length index indicating the first time length, the first time length being a time length in the first time length set; the first time length set comprises multiple time lengths.

In one embodiment, the second time resource pool comprises a positive integer number of slot(s).

In one embodiment, the second time resource pool comprises a positive integer number of sidelink slot(s).

In one embodiment, the first time length is used to determine the second time resource pool in a lower layer.

In one embodiment, a duration of the second time resource pool lasts no longer than the first time length.

In one embodiment, a duration of the second time resource pool is equal to the first time length.

In one embodiment, a duration of the second time resource pool comprises a time interval between an earliest time unit comprised in the second time resource pool and a latest time unit comprised in the second time resource pool.

In one embodiment, a time interval from a latest time unit comprised in the second time resource pool to the first time unit does not exceed the first time length.

In one embodiment, the action of selecting a second time unit from a second time resource pool is performed in a higher layer.

In one embodiment, the action of selecting a second time unit from a second time resource pool is performed in a lower layer.

In one embodiment, the second time resource pool is determined in a lower layer.

In one embodiment, the higher layer includes the L2 layer; the lower layer includes the L1 layer.

In one embodiment, the higher layer includes the MAC layer; the lower layer includes the physical layer.

In one embodiment, a position of the first time unit is used to determine the first time length.

Embodiment 2A

Figure 2A:
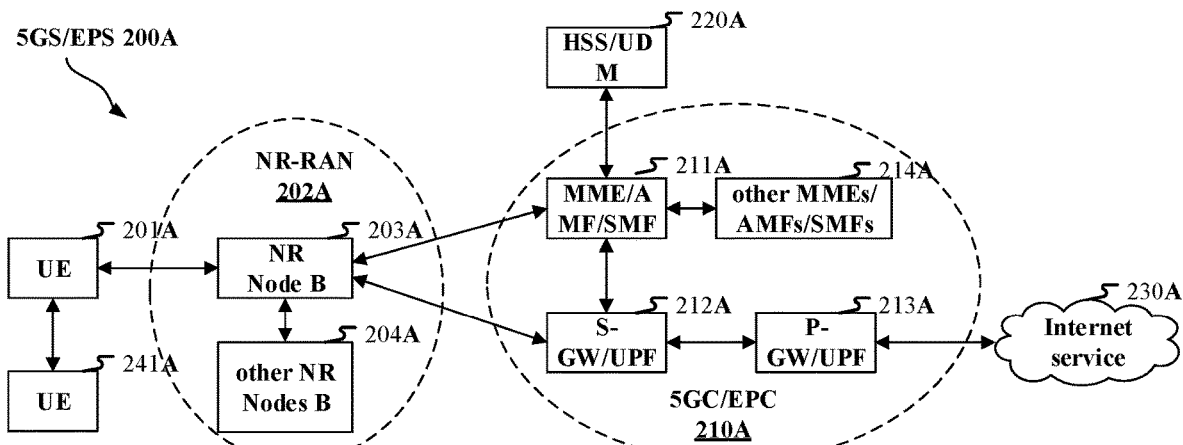
FIG. 2A illustrates a schematic diagram of a network architecture according to one embodiment of the present application.

Embodiment 2A illustrates a schematic diagram of a network architecture according to the present application, as shown in FIG. 2A. FIG. 2A is a diagram illustrating a network architecture 200A of NR 5G, Long-Term Evolution (LTE), and Long-Term Evolution Advanced (LTE-A) systems. The NR 5G or LTE network architecture 200A may be called a 5G System/Evolved Packet System (5GS/EPS) 200 or any other applicable terms. The 5GS/EPS 200A may comprise one or more UEs 201A, an NG-RAN 202A, a 5G Core Network/Evolved Packet Core (5GC/EPC) 210A, a Home Subscriber Server (HSS)/Unified Data Management (UDM) 220A and an Internet Service 230A. The 5GS/EPS 200A may be interconnected with other access networks. For simple description, the entities/interfaces are not shown. As shown in FIG. 2A, the 5GS/EPS 200A provides packet switching services. Those skilled in the art will find it easy to understand that various concepts presented throughout the present application can be extended to networks providing circuit switching services or other cellular networks. The NG-RAN 202A comprises a New Radio (NR) node B (gNB) 203A and other gNBs 204A. The gNB 203A provides UE 201A-oriented user plane and control plane protocol terminations. The gNB 203A may be connected to other gNBs 204A via an Xn interface (for example, backhaul). The gNB 203A may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203A can be the satellite, an aircraft or a terrestrial base station relayed by the satellite. The gNB 203A provides an access point of the 5G-CN/EPC 210A for the UE 201A. Examples of UE 201A include cellular phones, smart phones, Session Initiation Protocol (SIP) phones, laptop computers, Personal Digital Assistant (PDA), Satellite Radios, Global Positioning System (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, vehicle-mounted equipment, vehicle-mounted communication units, wearables, or any other devices having similar functions. Those skilled in the art also can call the UE 201A a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203A is connected to the 5GC/EPC 210A via an S1/NG interface. The 5GC/EPC 210A comprises a Mobility Management Entity (MME)/Authentication Management Field (AMF)/Session Management Function (SMF) 214A, other MMEs/AMFs/SMFs 214A, a Service Gateway (S-GW)/User Plane Function (UPF) 212A and a Packet Date Network Gateway (P-GW)/UPF 213A. The MME/AMF/SMF 211A is a control node for processing a signaling between the UE 201A and the 5GC/EPC 210A. Generally, the MME/AMF/SMF 211A provides bearer and connection management. All user Internet Protocol (IP) packets are transmitted through the S-GW/UPF 212A. The S-GW/UPF 212A is connected to the P-GW/UPF 213A. The P-GW 213A provides UE IP address allocation and other functions. The P-GW/UPF 213A is connected to the Internet Service 230A. The Internet Service 230A comprises operator-compatible IP services, specifically including Internet, Intranet, IP Multimedia Subsystem (IMS) and Packet Switching (PS) Streaming services.

In one embodiment, the UE 201A corresponds to the first node in the present application.

In one embodiment, the UE 241A corresponds to the second node in the present application.

In one embodiment, the UE 201A and the UE 241A respectively support transmissions in SL.

In one embodiment, the UE 201A and the UE 241A respectively support a PC5 interface.

In one embodiment, the UE 201A and the UE 241A respectively support Vehicle-to-Everything (V2X).

In one embodiment, the UE 201A and the UE 241A respectively support V2X services.

In one embodiment, the UE 201A and the UE 241A respectively support D2D services.

In one embodiment, the UE 201A and the UE 241A respectively support public safety services.

In one embodiment, the gNB203A supports Vehicle-to-Everything (V2X).

In one embodiment, the gNB203A supports V2X services.

In one embodiment, the gNB203A supports D2D services.

In one embodiment, the gNB203A supports public safety services.

In one embodiment, the gNB203A is a Macro Cell base station.

In one embodiment, the gNB203A is a Micro Cell base station.

In one embodiment, the gNB203A is a Pico Cell base station.

In one embodiment, the gNB203A is a Femtocell.

In one embodiment, the gNB203A is a base station supporting large time-delay difference.

In one embodiment, the gNB203A is a flight platform.

In one embodiment, the gNB203A is satellite equipment.

In one embodiment, a radio link from the UE201A to the gNB203A is uplink.

In one embodiment, a radio link from the gNB203A to the UE201A is downlink.

In one embodiment, a radio link between the UE201A and the UE241A corresponds to the sidelink in the present application.

Embodiment 2B

Figure 2B:
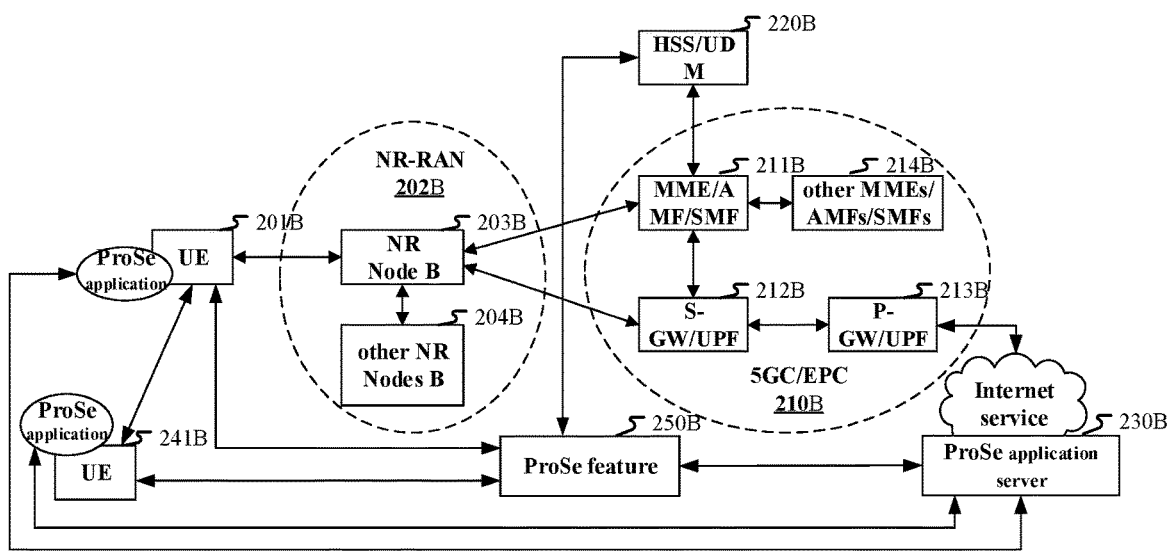
FIG. 2B illustrates a schematic diagram of a network architecture according to one embodiment of the present application.

Embodiment 2B illustrates a schematic diagram of a network architecture according to one embodiment of the present application, as shown in FIG. 2B. FIG. 2B is a diagram illustrating a V2X communication architecture of NR 5G, Long-Term Evolution (LTE), and Long-Term Evolution Advanced (LTE-A) systems. The NR 5G or LTE network architecture may be called a 5G System/Evolved Packet System (5GS/EPS) 200 or other appropriate terms.

The V2X communication architecture in Embodiment 2B may comprise a UE 201B, a UE 241B, an NG-RAN 202B, a 5G Core Network/Evolved Packet Core (5GC/EPC) 210B, a Home Subscriber Server (HSS)/Unified Data Management (UDM) 220B, a ProSe feature 250B and a ProSe application server 230B. The V2X communication architecture may be interconnected with other access networks. For simple description, the entities/interfaces are not shown. As shown in FIG. 2, the V2X communication architecture provides packet switching services. Those skilled in the art will readily understand that various concepts presented throughout the present application can be extended to networks providing circuit switching services or other cellular networks. The NG-RAN 202B comprises an NR node B (gNB) 203B and other gNBs 204B. The gNB 203B provides UE 201B-oriented user plane and control plane protocol terminations. The gNB 203B may be connected to other gNBs 204B via an Xn interface (for example, backhaul). The gNB 203B may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203B in NTN can be one of the satellite, an aircraft or a terrestrial base station relayed by the satellite. The gNB 203B provides an access point of the 5GC/EPC 210B for the UE 201B. Examples of UE 201B include cellular phones, smart phones, Session Initiation Protocol (SIP) phones, laptop computers, Personal Digital Assistant (PDA), Satellite Radios, Global Positioning Systems (GPS), multimedia devices, video devices, digital audio players (for example, MP3 players), cameras, games consoles, unmanned aerial vehicles, air vehicles, narrowband physical network equipment, machine-type communication equipment, land vehicles, automobiles, vehicle-mounted equipment, vehicle-mounted communication units, wearables, or any other devices having similar functions. Those skilled in the art also can call the UE 201B a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203B is connected to the 5GC/EPC 210B via an S1/NG interface. The 5GC/EPC 210B comprises a Mobility Management Entity (MME)/Authentication Management Field (AMF)/Session Management Function (SMF) 211B, other MMES/AMFs/SMFs 214B, a Service Gateway (S-GW)/User Plane Function (UPF) 212B and a Packet Date Network Gateway (P-GW)/UPF 213B. The MME/AMF/SMF 211B is a control node for processing a signaling between the UE 201B and the 5GC/EPC 210B. Generally, the MME/AMF/SMF 211B provides bearer and connection management. All user Internet Protocol (IP) packets are transmitted through the S-GW/UPF 212B. The S-GW/UPF 212B is connected to the P-GW/UPF 213B. The P-GW 213B provides UE IP address allocation and other functions. The P-GW/UPF 213B is connected to the Internet Service 230B. The Internet Service 230B comprises operator-compatible IP services, specifically including Internet, Intranet, IP Multimedia Subsystem (IMS) and Packet Switching (PS) Streaming services. The ProSe feature 250B refers to logical functions of network-related actions needed for Proximity-based Service (ProSe), including Direct Provisioning Function (DPF), Direct Discovery Name Management Function and EPC-level Discovery ProSe Function. The ProSe application server 230B is featured with functions like storing EPC ProSe user ID, and mapping between an application-layer user ID and an EPC ProSe user ID as well as allocating ProSe-restricted code-suffix pool.

In one embodiment, the UE 201B corresponds to the first node in the present application.

In one embodiment, the UE 241B corresponds to the second node in the present application.

In one embodiment, the UE 201B and the UE 241B respectively support transmissions in SL.

In one embodiment, the UE 201B and the UE 241B respectively support PC5 interfaces.

In one embodiment, the UE 201B and the UE 241B respectively support Vehicle-to-Everything (V2X).

In one embodiment, the UE 201B and the UE 241B respectively support V2X services.

In one embodiment, the UE 201B and the UE 241B respectively support D2D services.

In one embodiment, the UE 201B and the UE 241B respectively support public safety services.

In one embodiment, the gNB203B supports Vehicle-to-Everything (V2X).

In one embodiment, the gNB203B supports V2X services.

In one embodiment, the gNB203B supports D2D services.

In one embodiment, the gNB203B supports public safety services.

In one embodiment, the gNB203B is a Macro Cell base station.

In one embodiment, the gNB203B is a Micro Cell base station.

In one embodiment, the gNB203B is a Pico Cell base station.

In one embodiment, the gNB203B is a Femtocell.

In one embodiment, the gNB203B is a base station supporting large time-delay difference.

In one embodiment, the gNB203B is a flight platform.

In one embodiment, the gNB203B is satellite equipment.

In one embodiment, a radio link from the UE201B to the gNB203B is uplink.

In one embodiment, a radio link from the gNB203B to the UE201B is downlink.

In one embodiment, a radio link between the UE201B and the UE241B corresponds to the sidelink in the present application.

In one embodiment, the UE201B and the gNB203B are connected by a Uu interface.

In one embodiment, the UE201B and the UE241B are connected by a PC5 Reference Point.

In one embodiment, the ProSe feature 250B is connected to the UE 201B and the UE 241B respectively by PC3 Reference Points.

In one embodiment, the ProSe feature 250B is connected to the ProSe application server 230B by a PC2 Reference Point.

In one embodiment, the ProSe application server 230B is respectively connected to the ProSe applications of the UE 201B and the UE 241B by PC1 Reference Points.

Embodiment 3

Figure 3:
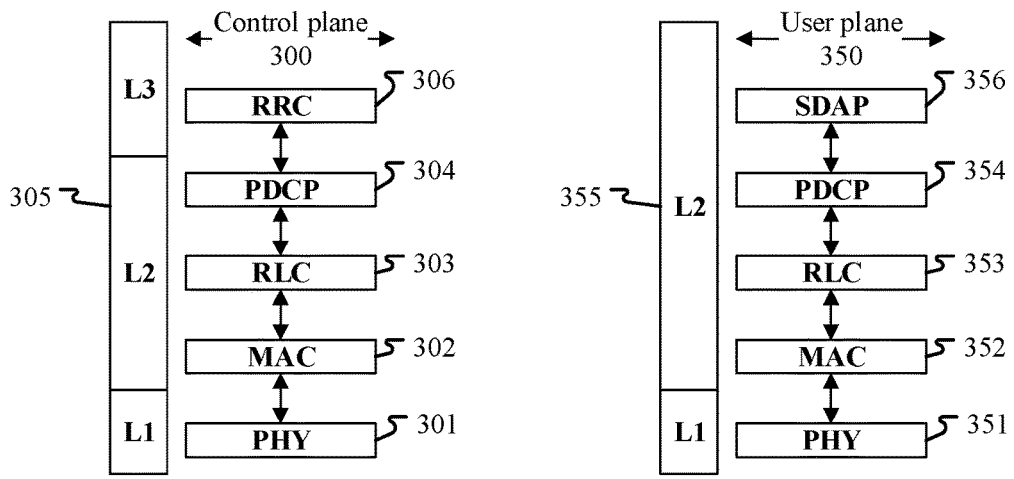
FIG. 3 illustrates a schematic diagram of a protocol architecture of a user plane and a control plane according to one embodiment of the present application.

Embodiment 3 illustrates a schematic diagram of an embodiment of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, or Road Side Unit/RSU in V2X, vehicle-mounted equipment or vehicle-mounted communication module) and a second node (gNB, UE, or RSU in V2X, vehicle-mounted equipment or vehicle-mounted communication module), or between two UEs is represented by three layers, i.e., Layer 1, layer 2 and layer 3. The layer 1 (L1) is the lowest layer which performs signal processing functions of various PHY layers. The L1 is called PHY 301 in the present application. The layer 2 (L2) 305 is above the PHY 301, and is in charge of the link between the first node and the second node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes of the network side. The PDCP sublayer 304 provides data encryption and integrity protection, and provides support for handover of a first node between second nodes. The RLC sublayer 303 provides segmentation and reassembling of a packet, retransmission of a lost packet via ARQ, as well as support for detections over repeated packets and protocol errors. The MAC sublayer 302 provides mapping between a logical channel and a transport channel and multiplexing of logical channels. The MAC sublayer 302 is also responsible for allocating between first nodes various radio resources (i.e., resource block) in a cell. The MAC sublayer 302 is also in charge of Hybrid Automatic Repeat Request (HARQ) operation. In the control plane 300, The Radio Resource Control (RRC) sublayer 306 in the L3 layer is responsible for acquiring radio resources (i.e., radio bearer) and configuring the lower layer using an RRC signaling between the second node and the first node. Although not shown in the figure, above the RRC sublayer 306 in the control plane 300 of the UE there can be a V2X layer, which is in charge of generating a PC5 QoS parameter group and a QoS rule according to received traffic data or traffic requests, generating a PC5 QoS flow corresponding to the PC5 QoS parameter group and sending a PC5 QoS flow ID and the corresponding PC5 QoS parameter group to an Access Stratum (AS) to be used for QoS processing of a packet that belongs to the PC5 QoS flow ID; the V2X layer is also responsible for indicating whether each transmission in the AS layer is a PC5-Signaling (PC5-S) Protocol transmission or a V2X traffic data transmission. The radio protocol architecture in the user plane 350 comprises the L1 layer and the L2 layer. In the user plane 350, the radio protocol architecture in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between Quality of Service (QoS) streams and a Data Radio Bearer (DRB), so as to support diversified traffics. The radio protocol architecture of the first node and the second node in the user plane 350 may comprise all or part of protocol sublayers of a PHY layer 351, a SDAP sublayer in the L2 355, a PDCP sublayer 354 in the L2 355, a RLC sublayer 353 in the L2 355 and a MAC sublayer 352 in the L2 355. Although not described in FIG. 3, the first node and the second node may comprise several upper layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to a first node in the present application.

In one embodiment, the radio protocol architecture in FIG. 3 is applicable to a second node in the present application.

In one embodiment, the radio protocol architecture in FIG. 3 is applicable to another UE in the present application.

In one embodiment, the transmission state of the first channel in the present application is generated by the MAC302 or the MAC352.

In one embodiment, the transmission state of the first channel in the present application is generated by the RLC303 or the RLC353.

In one embodiment, the transmission state of the first channel in the present application is generated by the PHY301 or the PHY351.

In one embodiment, the first assistance information in the present application is generated by the RRC306 or the MAC302.

In one embodiment, the first time length in the present application is generated by the RRC306.

In one embodiment, the first configuration information in the present application is generated by the RRC306.

In one embodiment, the first MAC SDU in the present application is generated by the MAC302 or the MAC352.

In one embodiment, the second MAC SDU in the present application is generated by the MAC302 or the MAC352.

In one embodiment, the first MAC sub-PDU in the present application is generated by the MAC302 or the MAC352.

In one embodiment, the first MAC PDU in the present application is generated by the MAC302 or the MAC352.

In one embodiment, the second MAC PDU in the present application is generated by the MAC302 or the MAC352.

In one embodiment, the L2 305 belongs to a higher layer.

In one embodiment, the RRC sublayer 306 in the L3 belongs to a higher layer.

Embodiment 4A

Figure 4A:
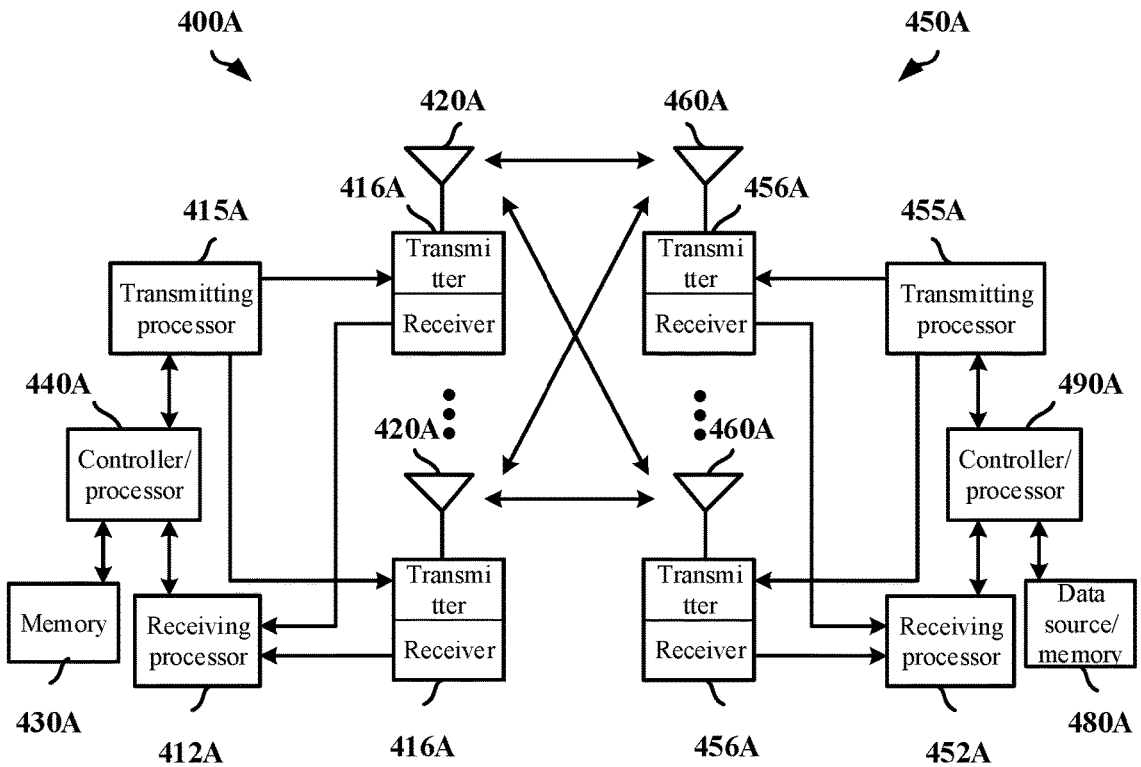
FIG. 4A illustrates a schematic diagram of a first node and a second node according to one embodiment of the present application.

Embodiment 4A illustrates a schematic diagram of a first node and a second node according to the present application, as shown in FIG. 4A.

The first node (450A) can comprise a controller/processor 490A, a receiving processor 452A, a transmitting processor 455A, a transmitter/receiver 456A and a data source/memory 480A, where the transmitter/receiver 456A comprises an antenna 460A.

The second node (400A) can comprise a controller/processor 440A, a receiving processor 412A, a transmitting processor 415A, a transmitter/receiver 416A and a memory 430A, where the transmitter/receiver 416A comprises an antenna 420A.

In a transmission from the second node 400A to the first node 450A, at the second node 400A, a higher-layer packet is provided to the controller/processor 440A. The controller/processor 440A provides the functions of the L2, the V2X layer and above layers. In a transmission from the second node 400A to the first node 450A, the controller/processor 440A provides header compression, encryption, packet segmentation and reordering, multiplexing between a logical channel and a transport channel as well as radio resources allocation for the first node 450A based on various priorities. The controller/processor 440A is also responsible for HARQ operation, retransmission of a lost packet, and a signaling to the first node 450A. The transmitting processor 415A provides various signal processing functions used for the L1 (that is, PHY), including coding, interleaving, scrambling, modulation, power control/allocation, precoding and physical layer control signaling generation. Modulation symbols generated are divided into parallel streams and each stream is mapped to a corresponding multicarrier subcarrier and/or multicarrier symbol, and is then mapped from the transmitting processor 415A to the antenna 420A via the transmitter 416A to be transmitted in the form of radio frequency signals.

In a transmission from the second node 400A to the first node 450A, at the first node 450A, each receiver 456A receives an RF signal via a corresponding antenna 460A, recovers baseband information modulated into the RF carrier and then provides the baseband information to the receiving processor 452A. The receiving processor 452A performs various signal receiving processing functions used for the L1. The signal receiving processing functions include receiving physical-layer signals, multicarrier symbols in multicarrier symbol streams are demodulated based on varied modulation schemes (i.e., BPSK, QPSK), and are then subjected to descrambling, decoding and deinterleaving so as to recover data or control signals transmitted by the second node 400A in a physical channel. After that the data or control signal is provided to the controller/processor 490A. The controller/processor 490A is in charge of the functions of the L2, the V2X layer and above layers. The controller/processor can be associated with the memory 480A that stores program code and data; the data source/memory 480A may be called a computer readable medium.

In a transmission from the first node 450A to the second node 400A, at the first node 450A, the data source/memory 480A is configured to provide higher-layer data to the controller/processor 490A. The data source/memory 480A represents the L2, the V2X layer and all protocol layers above. The controller/processor 490A provides header compression, encryption, packet segmentation and reordering as well as multiplexing between logical and transport channels based on radio resources allocation for the second node 410A to perform the L2 protocols used for the user plane and the control plane. The controller/processor 490A is also responsible for HARQ operation, retransmission of a lost packet and a signaling to the second node 410A. The transmitting processor 455A performs resource selection of the L1, as well as various signal transmitting processing functions used for the L1 (that is, PHY). The signal transmitting processing functions include coding and interleaving so as to promote Forward Error Correction (FEC) at the UE 450A side and also modulation of baseband signals according to each modulation scheme (for example, BPSK, QPSK, etc.). The modulation symbols are divided into parallel streams and each stream is mapped into a corresponding multicarrier subcarrier and/or multicarrier symbol. The symbol streams are later mapped from the transmitting processor 455A to the antenna 460A via the transmitter 456A and transmitted in the form of RF signals.

In a transmission from the first node 450A to the second node 400A, at the second node 400A, the receiver 416A receives an RF signal via a corresponding antenna 420A; each receiver 416A recovers baseband information modulated onto an RF carrier, and provides the baseband information to the receiving processor 412A. The receiving processor 412A performs various signal receiving processing functions used for the L1 layer (that is, PHY), including acquiring multicarrier symbol streams, and then demodulating multicarrier symbols in multicarrier symbol streams based on various modulation schemes (i.e., BPSK, QPSK, etc.), after which the multicarrier symbols are decoded and deinterleaved to recover data and/or control signals originally transmitted by the first node 450A in a physical layer channel. After that the data and/or control signal are provided to the controller/processor 440A. The controller/processor 440A provides the functions of the L2, the V2X layer and above layers. The controller/processor 440A can be associated with the memory 430A that stores program code and data; the memory 430A may be called a computer readable medium.

In one embodiment, the first node 450A comprises at least one processor and at least one memory, the at least one memory comprises computer program codes; The at least one memory and the computer program codes are configured to be used in collaboration with the at least one processor. The first node 450A at least: transmits first assistance information, the first assistance information indicating a transmission state of a first channel; and receives first configuration information, the first configuration information indicating a first time length; and receives a first MAC PDU, the first MAC PDU comprising a first MAC subPDU, the first MAC subPDU comprising a first MAC SDU; selects a first time unit from a first time resource pool; and transmits a second MAC PDU in the first time unit; herein, the first assistance information is used for generating the first configuration information, and the second MAC PDU comprises at least partial bits in the first MAC SDU; the first channel connects the first node to a target receiver receiving the second MAC PDU; a second channel connects a transmitter transmitting the first MAC PDU to the first node; the transmitter transmitting the first MAC PDU and the target receiver receiving the second MAC PDU are Non-Co-located; the first time length is used to determine the first time resource pool.

In one embodiment, the first node 450A comprises a memory that stores a computer readable instruction program, the computer readable instruction program generates actions when executed by at least one processor, which include: transmitting first assistance information, the first assistance information indicating a transmission state of a first channel; and receiving first configuration information, the first configuration information indicating a first time length; and receiving a first MAC PDU, the first MAC PDU comprising a first MAC subPDU, the first MAC subPDU comprising a first MAC SDU; selecting a first time unit from a first time resource pool; and transmitting a second MAC PDU in the first time unit; herein, the first assistance information is used for generating the first configuration information, and the second MAC PDU comprises at least partial bits in the first MAC SDU; the first channel connects the first node to a target receiver receiving the second MAC PDU; a second channel connects a transmitter transmitting the first MAC PDU to the first node; the transmitter transmitting the first MAC PDU and the target receiver receiving the second MAC PDU are Non-Co-located; the first time length is used to determine the first time resource pool.

In one embodiment, the second node 400A comprises at least one processor and at least one memory, the at least one memory comprises computer program codes; the at least one memory and the computer program codes are configured to be used in collaboration with the at least one processor. The second node 400A at least: receives first assistance information, the first assistance information used for indicating a transmission state of a first channel; and transmits first configuration information, the first configuration information indicating a first time length; and transmits a first MAC PDU, the first MAC PDU comprising a first MAC subPDU, the first MAC subPDU comprising a first MAC SDU; herein, a first time unit is selected from a first time resource pool; a second MAC PDU is transmitted in the first time unit; the first assistance information is used for generating the first configuration information, the second MAC PDU comprising at least partial bits in the first MAC SDU; the first channel connects the first node to a target receiver receiving the second MAC PDU; a second channel connects a transmitter transmitting the first MAC PDU to the first node; the transmitter transmitting the first MAC PDU and the target receiver receiving the second MAC PDU are Non-Co-located; the first time length is used to determine the first time resource pool.

In one embodiment, the second node 400A comprises a memory that stores a computer readable instruction program, the computer readable instruction program generates actions when executed by at least one processor, which include: receiving first assistance information, the first assistance information used for indicating a transmission state of a first channel; and transmitting first configuration information, the first configuration information indicating a first time length; and transmitting a first MAC PDU, the first MAC PDU comprising a first MAC subPDU, the first MAC subPDU comprising a first MAC SDU; herein, a first time unit is selected from a first time resource pool; a second MAC PDU is transmitted in the first time unit; the first assistance information is used for generating the first configuration information, the second MAC PDU comprising at least partial bits in the first MAC SDU; the first channel connects the first node to a target receiver receiving the second MAC PDU; a second channel connects a transmitter transmitting the first MAC PDU to the first node; the transmitter transmitting the first MAC PDU and the target receiver receiving the second MAC PDU are Non-Co-located; the first time length is used to determine the first time resource pool.

In one embodiment, the first node 450A is a UE.

In one embodiment, the first node 450A is a UE supporting V2X.

In one embodiment, the first node 450A is a UE supporting D2D.

In one embodiment, the first node 450A is vehicle-mounted equipment.

In one embodiment, the first node 450A is a Road Side Unit (RSU).

In one embodiment, the second node 400A is a UE.

In one embodiment, the second node 400A is a UE supporting V2X.

In one embodiment, the second node 400A is a UE supporting D2D.

In one embodiment, the second node 400A is vehicle-mounted equipment.

In one embodiment, the second node 400A is a Road Side Unit (RSU).

In one embodiment, at least one of the transmitter 456A (including the antenna 460A), the transmitting processor 455A or the controller/processor 490A is used for transmitting the first assistance information in the present application.

In one embodiment, at least one of the receiver 416A (including the antenna 420A), the receiving processor 412A or the controller/processor 440A is used for receiving the first assistance information in the present application.

In one embodiment, at least one of the receiver 456A (including the antenna 460A), the receiving processor 452A or the controller/processor 490A is used for receiving the first configuration information in the present application.

In one embodiment, at least one of the transmitter 416A (including the antenna 420A), the transmitting processor 415A or the controller/processor 440A is used for transmitting the first configuration information in the present application.

In one embodiment, at least one of the receiver 456A (including the antenna 460A), the receiving processor 452A or the controller/processor 490A is used for receiving the first MAC PDU in the present application.

In one embodiment, at least one of the transmitter 416A (including the antenna 420A), the transmitting processor 415A or the controller/processor 440A is used for transmitting the first MAC PDU in the present application.

In one embodiment, at least one of the receiver 416A (including the antenna 420A), the receiving processor 412A or the controller/processor 440A is used for determining the target time length in the present application.

In one embodiment, at least one of the receiver 416A (including the antenna 420A), the receiving processor 412A or the controller/processor 440A is used for receiving the first threshold in the present application.

In one embodiment, the controller/processor 490A is used for generating the first assistance information in the present application.

In one embodiment, the controller/processor 490A is used for generating the second MAC PDU in the present application.

In one embodiment, the controller/processor 440A is used for generating the first configuration information in the present application.

In one embodiment, the controller/processor 440A is used for generating the first MAC PDU in the present application.

In one embodiment, the controller/processor 440A is used for generating the first MAC sub-PDU in the present application.

In one embodiment, the controller/processor 440A is used for generating the first MAC SDU in the present application.

Embodiment 4B

Figure 4B:
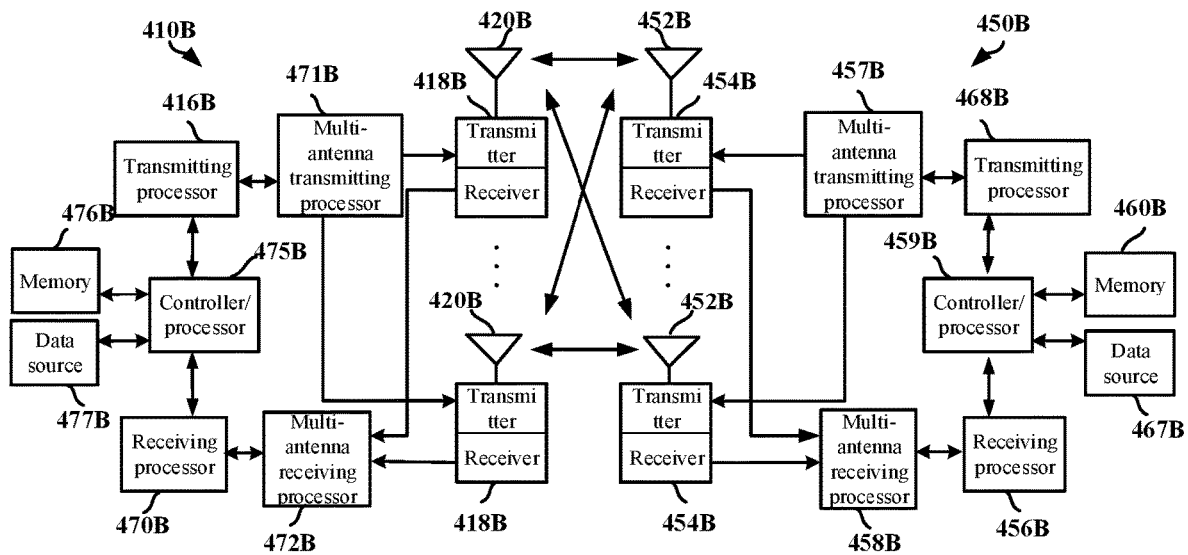
FIG. 4B illustrates a schematic diagram of hardcore modules in a communication device according to one embodiment of the present application.

Embodiment 4B illustrates a schematic diagram of hardcore modules in a communication device according to one embodiment of the present application, as shown in FIG. 4B. FIG. 4B is a block diagram of a first communication device 450B and a second communication device 410B in communication with each other in an access network.

The first communication device 450B comprises a controller/processor 459B, a memory 460B, a data source 467B, a transmitting processor 468B, a receiving processor 456B, a multi-antenna transmitting processor 457B, a multi-antenna receiving processor 458B, a transmitter/receiver 454B and an antenna 452B.

The second communication device 410B comprises a controller/processor 475B, a memory 476B, a data source 477B, a receiving processor 470B, a transmitting processor 416B, a multi-antenna receiving processor 472B, a multi-antenna transmitting processor 471B, a transmitter/receiver 418B and an antenna 420B.

In a transmission from the second communication device 410B to the first communication device 450B, at the second communication device 410B, a higher-layer packet from a core network or from the data source 477B is provided to the controller/processor 475B. The core network and data source 477B represents all protocol layers above the L2 layer. The controller/processor 475B provides functions of the L2 layer. In the transmission from the second communication device 410B to the first communication device 450B, the controller/processor 475B provides header compression, encryption, packet segmentation and reordering, and multiplexing between a logical channel and a transport channel, and radio resource allocation of the first communication device 450B based on various priorities. The controller/processor 475B is also in charge of a retransmission of a lost packet and a signaling to the first communication device 450B. The transmitting processor 416B and the multi-antenna transmitting processor 471B perform various signal processing functions used for the L1 layer (i.e., PHY). The transmitting processor 416B performs coding and interleaving so as to ensure a Forward Error Correction (FEC) at the second communication device 410B side and the mapping of signal clusters corresponding to each modulation scheme (i.e., BPSK, QPSK, M-PSK, and M-QAM, etc.). The multi-antenna transmitting processor 471B performs digital spatial precoding, which includes precoding based on codebook and precoding based on non-codebook, and beamforming processing on encoded and modulated signals to generate one or more spatial streams. The transmitting processor 416B then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471B performs transmission analog precoding/beamforming on the time-domain multicarrier symbol streams. Each transmitter 418B converts a baseband multicarrier symbol stream provided by the multi-antenna transmitting processor 471B into a radio frequency (RF) stream, which is later provided to different antennas 420B.

In a transmission from the second communication device 410B to the first communication device 450B, at the first communication device 450B, each receiver 454B receives a signal via a corresponding antenna 452B. Each receiver 454B recovers information modulated to the RF carrier, and converts the radio frequency stream into a baseband multicarrier symbol stream to be provided to the receiving processor 456B. The receiving processor 456B and the multi-antenna receiving processor 458B perform signal processing functions of the L1 layer. The multi-antenna receiving processor 458B performs reception analog precoding/beamforming on a baseband multicarrier symbol stream provided by the receiver 454B. The receiving processor 456B converts the processed baseband multicarrier symbol stream from time domain into frequency domain using FFT. In frequency domain, a physical layer data signal and a reference signal are de-multiplexed by the receiving processor 456B, wherein the reference signal is used for channel estimation, while the data signal is subjected to multi-antenna detection in the multi-antenna receiving processor 458B to recover any first communication device 450B-targeted spatial stream. Symbols on each spatial stream are demodulated and recovered in the receiving processor 456B to generate a soft decision. Then the receiving processor 456B decodes and de-interleaves the soft decision to recover the higher-layer data and control signal transmitted by the second communication device 410B on the physical channel. Next, the higher-layer data and control signal are provided to the controller/processor 459B. The controller/processor 459B provides functions of the L2 layer. The controller/processor 459B can be associated with the memory 460B that stores program code and data. The memory 460B can be called a computer readable medium. In a transmission from the second communication device 410B to the first communication device 450B, the controller/processor 459B provides de-multiplexing between a transport channel and a logical channel, packet reassembling, decrypting, header decompression, control signal processing so as to recover a higher-layer packet from the second communication device 410B. The higher-layer packet is later provided to all protocol layers above the L2 layer. Or various control signals can be provided to the L3 for processing.

In a transmission from the first communication device 450B to the second communication device 410B, at the first communication device 450B, the data source 467B is used to provide a higher-layer packet to the controller/processor 459B. The data source 467B represents all protocol layers above the L2 layer. Similar to a transmitting function of the second communication device 410B described in the transmission from the second communication device 410B to the first communication device 450B, the controller/processor 459B performs header compression, encryption, packet segmentation and reordering, and multiplexing between a logical channel and a transport channel so as to provide the L2 layer functions used for the user plane and the control plane. The controller/processor 459B is also responsible for a retransmission of a lost packet, and a signaling to the second communication device 410B. The transmitting processor 468B performs modulation and mapping, as well as channel coding, and the multi-antenna transmitting processor 457B performs digital multi-antenna spatial precoding, including codebook-based precoding and non-codebook-based precoding, and beamforming. The transmitting processor 468B then modulates generated spatial streams into multicarrier/single-carrier symbol streams. The modulated symbol streams, after being subjected to analog precoding/beamforming in the multi-antenna transmitting processor 457B, are provided from the transmitter 454B to each antenna 452B. Each transmitter 454B first converts a baseband symbol stream provided by the multi-antenna transmitting processor 457B into a radio frequency symbol stream, and then provides the radio frequency symbol stream to the antenna 452B.

In a transmission from the first communication device 450B to the second communication device 410B, the function of the second communication device 410B is similar to the receiving function of the first communication device 450B described in the transmission from the second communication device 410B to the first communication device 450B. Each receiver 418B receives a radio frequency signal via a corresponding antenna 420B, converts the received radio frequency signal into a baseband signal, and provides the baseband signal to the multi-antenna receiving processor 472B and the receiving processor 470B. The receiving processor 470B and the multi-antenna receiving processor 472B jointly provide functions of the L1 layer. The controller/processor 475B provides functions of the L2 layer. The controller/processor 475B can be associated with the memory 476B that stores program code and data. The memory 476B can be called a computer readable medium. In the transmission from the first communication device 450B to the second communication device 410B, the controller/processor 475B provides de-multiplexing between a transport channel and a logical channel, packet reassembling, decrypting, header decompression, control signal processing so as to recover a higher-layer packet from the first communication device 450B. The higher-layer packet coming from the controller/processor 475B may be provided to the core network, or all protocol layers above the L2, or, various control signals can be provided to the core network or L3 for processing.

In one embodiment, the first communication device 450B comprises at least one processor and at least one memory, the at least one memory comprises computer program codes; the at least one memory and the computer program codes are configured to be used in collaboration with the at least one processor. The first communication device 450B at least: receives a first MAC PDU in a first time unit; selects a second time unit from a second time resource pool; and transmits a second MAC PDU in the second time unit; herein, the first MAC PDU comprises a first MAC subPDU, the first MAC subPDU comprising a first MAC subheader and a first MAC SDU; the first MAC subheader indicates a first time length; the first time length is used to determine the second time resource pool; the second MAC PDU comprises at least partial bits in the first MAC SDU; the first time length is dependent on a position of the first time unit.

In one embodiment, the first communication device 450B comprises a memory that stores a computer readable instruction program, the computer readable instruction program generates actions when executed by at least one processor, which include: receiving a first MAC PDU in a first time unit; selecting a second time unit from a second time resource pool; and transmitting a second MAC PDU in the second time unit; herein, the first MAC PDU comprises a first MAC subPDU, the first MAC subPDU comprising a first MAC subheader and a first MAC SDU; the first MAC subheader indicates a first time length; the first time length is used to determine the second time resource pool; the second MAC PDU comprises at least partial bits in the first MAC SDU; the first time length is dependent on a position of the first time unit.

In one embodiment, the second communication device 400B comprises at least one processor and at least one memory, the at least one memory comprises computer program codes; the at least one memory and the computer program codes are configured to be used in collaboration with the at least one processor. The second communication device 400B at least: transmits a first MAC PDU in a first time unit; herein, the first MAC PDU comprises a first MAC subPDU, the first MAC subPDU comprising a first MAC subheader and a first MAC SDU; the first MAC subheader indicates a first time length; the first time length is used to determine a second time resource pool; a second MAC PDU is transmitted in a second time unit, the second time unit being selected from the second time resource pool; the second MAC PDU comprises at least partial bits in the first MAC SDU; the first time length is dependent on a position of the first time unit.

In one embodiment, the second communication device 400B comprises a memory that stores a computer readable instruction program, the computer readable instruction program generates actions when executed by at least one processor, which include: transmitting a first MAC PDU in a first time unit; herein, the first MAC PDU comprises a first MAC subPDU, the first MAC subPDU comprising a first MAC subheader and a first MAC SDU; the first MAC subheader indicates a first time length; the first time length is used to determine a second time resource pool; a second MAC PDU is transmitted in a second time unit, the second time unit being selected from the second time resource pool; the second MAC PDU comprises at least partial bits in the first MAC SDU; the first time length is dependent on a position of the first time unit.

In one embodiment, the first communication device 450B corresponds to the first node in the present application.

In one embodiment, the second communication device 410B corresponds to the second node in the In one embodiment, the first communication device 450B is a UE.

In one embodiment, the first communication device 450B is a UE supporting V2X.

In one embodiment, the first communication device 450B is a UE supporting D2D.

In one embodiment, the first communication device 450B is vehicle-mounted equipment.

In one embodiment, the first communication device 450B is an RSU.

In one embodiment, the second communication device 410B is a UE.

In one embodiment, the second communication device 410B is a UE supporting V2X.

In one embodiment, the second communication device 410B is a UE supporting D2D.

In one embodiment, the second communication device 410B is vehicle-mounted equipment.

In one embodiment, the second communication device 410B is an RSU.

In one embodiment, the second communication device 410B is a base station.

In one embodiment, the antenna 452B, the receiver 454B, the multi-antenna receiving processor 458B, the receiving processor 456B, and the controller/processor 459B are used for receiving the first MAC PDU in the present application.

In one embodiment, the antenna 420B, the transmitter 418B, the multi-antenna transmitting processor 471B, the transmitting processor 416B, and the controller/processor 475B are used for transmitting the first MAC PDU in the present application.

Embodiment 5A

Figure 5A:
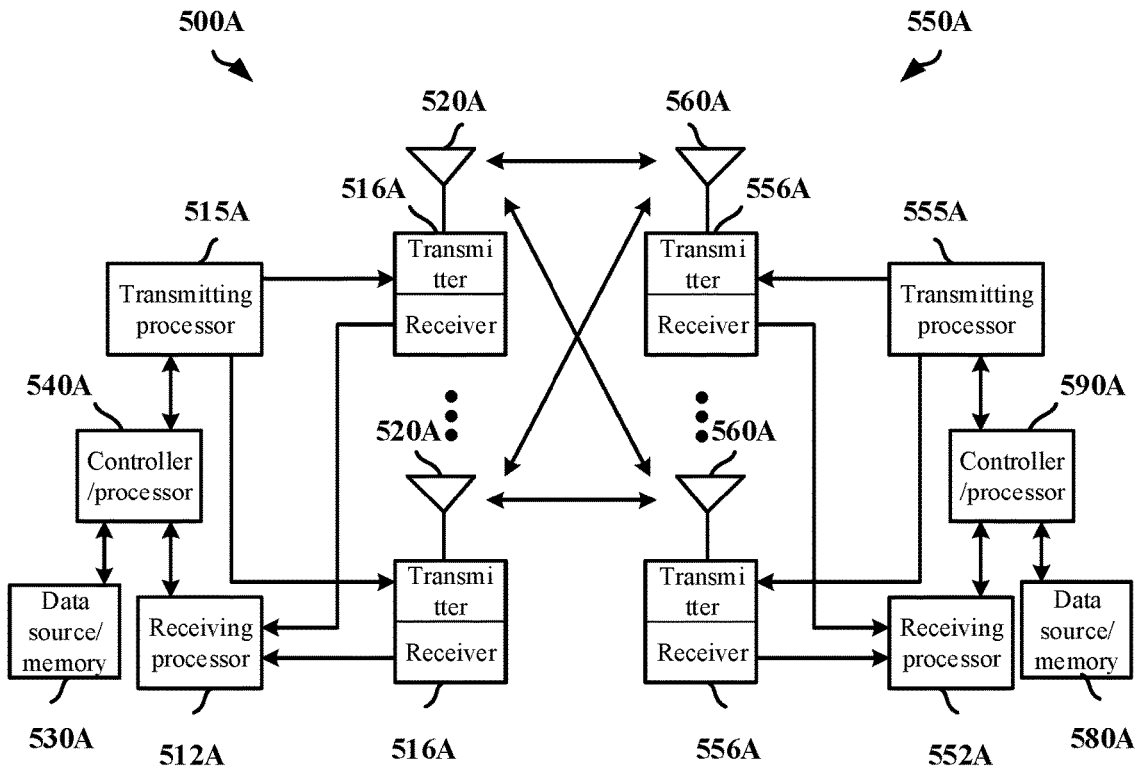
FIG. 5A illustrates a schematic diagram of a first node and another UE according to one embodiment of the present application.

Embodiment 5A illustrates a schematic diagram of a first node and another UE according to one embodiment of the present application, as shown in FIG. 5A.

The first node (550A) comprises a controller/processor 590A, a data source/memory 580A, a receiving processor 552A, a transmitter/receiver 556A, and a transmitting processor 555A, where the transmitter/receiver 556A comprises an antenna 560A.

The other UE (500A) comprises a controller/processor 540A, a data source/memory 530A, a receiving processor 512A, a transmitter/receiver 516A, and a transmitting processor 515A, where the transmitter/receiver 516A comprises an antenna 520A.

In a sidelink transmission, from the other UE 500A to the first node 550A, at the other UE 500A, a higher-layer packet is provided to the controller/processor 540A, the controller/processor 540A providing functions of the L2, the V2X layer and above layers. In the sidelink transmission, the controller/processor 540A provides header compression, encryption, packet segmentation and reordering, and multiplexing between a logical channel and a transport channel. The controller/processor 540A is also responsible for HARQ operation (if supportable), repetitions, and a signaling to the second node 550A. The transmitting processor 515A provides various signal processing functions used for the L1 (that is, PHY), including coding, interleaving, scrambling, modulation, power control/allocation, precoding and physical layer control signaling generation. Modulation symbols generated are divided into parallel streams and each stream is mapped to a corresponding multicarrier subcarrier and/or multicarrier symbol, and is then mapped from the transmitting processor 515A to the antenna 520A via the transmitter 516A to be transmitted in the form of radio frequency signals.

In the sidelink transmission, from the other UE 500A to the first node 550A, at the first node 550A, the receiver 556A receives a radio frequency (RF) signal via a corresponding antenna 560A, recovers baseband information modulated onto the RF carrier, and provides the baseband information to the receiving processor 552A. The receiving processor 552A performs various signal receiving processing functions used for the L1. Signal receiving processing functions include receiving physical layer signals, and demodulating multicarrier symbols in multicarrier symbol streams based on various modulation schemes (i.e., BPSK, QPSK), then de-scrambling, decoding and de-interleaving to recover data or control signal transmitted by the other UE 500A on a physical channel, and providing the data and control signal to the controller/processor 590A. The controller/processor 590A provides the processing of the L2, the V2X layer and above layers. The controller/processor can be associated with the memory 580A that stores program code and data; the data source/memory 580A may be called a computer readable medium.

In the sidelink transmission, from the first node 550A to the other UE 500A, at the first node 550A, a higher-layer packet is provided to the controller/processor 590A, and the controller/processor 590A provides the functions of the L2, the V2X and above layers. In the sidelink transmission, the controller/processor 590A provides header compression, encryption, packet segmentation and reordering, and multiplexing between a logical channel and a transport channel. The controller/processor 590A is also responsible for HARQ operation (if supportable), repetitions, and a signaling to the other UE 500A. The transmitting processor 555A provides various signal processing functions used for the L1 (that is, PHY), including coding, interleaving, scrambling, modulation, power control/allocation, precoding and physical layer control signaling generation. Modulation symbols generated are divided into parallel streams and each stream is mapped to a corresponding multicarrier subcarrier and/or multicarrier symbol, and is then mapped from the transmitting processor 555A to the antenna 556A via the transmitter 560A to be transmitted in the form of radio frequency signals.

In the sidelink transmission, from the first node 550A to the other UE 500A, at the other UE 500A, the receiver 516A receives a radio frequency (RF) signal via a corresponding antenna 520A, recovers baseband information modulated onto the RF carrier, and provides the baseband information to the receiving processor 512A. The receiving processor 512A performs various signal receiving processing functions used for the L1. Signal receiving processing functions include receiving physical layer signals, and demodulating multicarrier symbols in multicarrier symbol streams based on various modulation schemes (i.e., BPSK, QPSK), then de-scrambling, decoding and de-interleaving to recover data or control signal transmitted by the second node 550A on a physical channel, and providing the data and control signal to the controller/processor 540A. The controller/processor 540A provides the processing of the L2, the V2X layer and above layers. The controller/processor can be associated with the memory 530A that stores program code and data; the data source/memory 530A may be called a computer readable medium.

In one embodiment, the other UE 500A is a UE.

In one embodiment, the other UE 500A is a UE supporting V2X.

In one embodiment, the other UE 500A is a UE supporting D2D.

In one embodiment, the other UE 500A is vehicle-mounted equipment.

In one embodiment, the other UE 500A is an RSU.

In one embodiment, the transmitter 556A (including the antenna 560A), the transmitting processor 555A and the controller/processor 590A are used for transmitting the second MAC PDU in the present application.

In one embodiment, the receiver 516A (including the antenna 520A), the receiving processor 512A and the controller/processor 540A are used for receiving the second MAC PDU in the present application.

Embodiment 5B

Figure 5B:
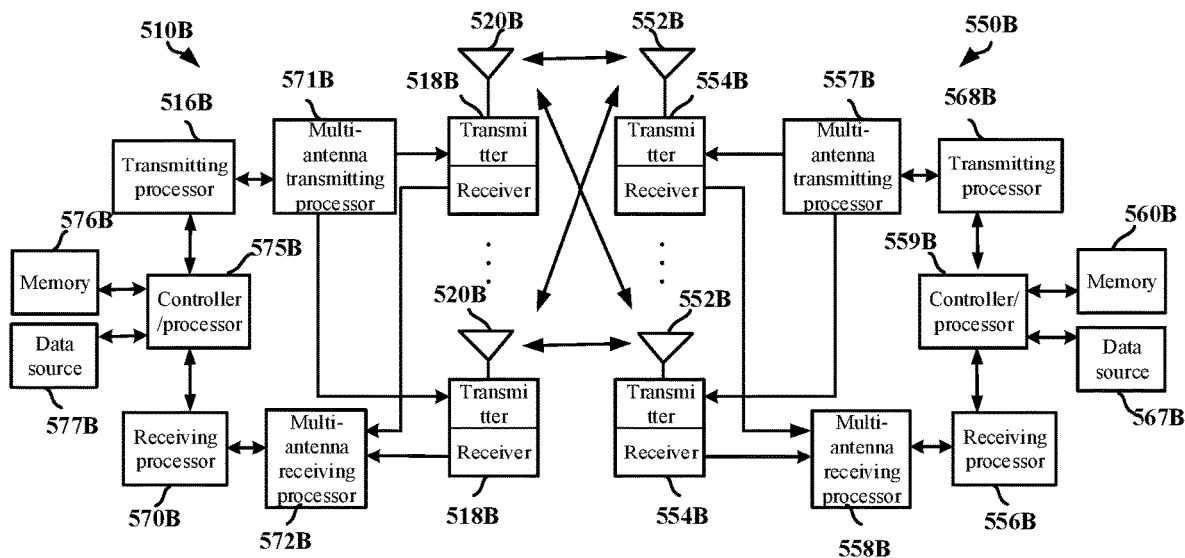
FIG. 5B illustrates a schematic diagram of hardcore modules in a first node and another UE according to one embodiment of the present application.

Embodiment 5B illustrates a schematic diagram of hardcore modules in a first node and another UE according to one embodiment of the present application, as shown in FIG. 5B.

The first node 550B comprises a controller/processor 559B, a memory 560B, a data source 567B, a transmitting processor 568B, a receiving processor 556B, a multi-antenna transmitting processor 557B, a multi-antenna receiving processor 558B, a transmitter/receiver 554B and an antenna 552B.

The other UE 510B comprises a controller/processor 575B, a memory 576B, a data source 577B, a receiving processor 570B, a transmitting processor 516B, a multi-antenna receiving processor 572B, a multi-antenna transmitting processor 571B, a transmitter/receiver 518B and an antenna 520B.

In a transmission from the other UE 510B to the first node 550B, at the other UE 510B, a higher-layer packet from the data source 577B is provided to the controller/processor 575B. The data source 577B represents all protocol layers above the L2 layer. The controller/processor 575B provides functions of the L2 layer. In the transmission from the other UE 510B to the first node 550B, the controller/processor 575B provides header compression, encryption, packet segmentation and reordering, and multiplexing between a logical channel and a transport channel, and radio resource allocation of the first node 550B based on various priorities. The controller/processor 575B is also in charge of a retransmission of a lost packet and a signaling to the first node

550B. The transmitting processor 516B and the multi-antenna transmitting processor 571B perform various signal processing functions used for the L1 layer (i.e., PHY). The transmitting processor 516B performs coding and interleaving so as to ensure a Forward Error Correction (FEC) at the other UE 510B side and the mapping of signal clusters corresponding to each modulation scheme (i.e., BPSK, QPSK, M-PSK, and M-QAM, etc.). The multi-antenna transmitting processor 571B performs digital spatial precoding, which includes precoding based on codebook and precoding based on non-codebook, and beamforming processing on encoded and modulated signals to generate one or more spatial streams. The transmitting processor 516B then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 571B performs transmission analog precoding/beamforming on the time-domain multicarrier symbol streams. Each transmitter 518B converts a baseband multicarrier symbol stream provided by the multi-antenna transmitting processor 571B into a radio frequency (RF) stream, which is later provided to different antennas 520B.

In a transmission from the other UE 510B to the first node, at the first node 550B, each receiver 554B receives a signal via a corresponding antenna 552B. Each receiver 554B recovers information modulated to the RF carrier, and converts the radio frequency stream into a baseband multicarrier symbol stream to be provided to the receiving processor 556B. The receiving processor 556B and the multi-antenna receiving processor 558B perform signal processing functions of the L1 layer. The multi-antenna receiving processor 558B performs reception analog precoding/beamforming on a baseband multicarrier symbol stream provided by the receiver 554B. The receiving processor 556B converts the processed baseband multicarrier symbol stream from time domain into frequency domain using FFT. In frequency domain, a physical layer data signal and a reference signal are de-multiplexed by the receiving processor 556B, wherein the reference signal is used for channel estimation, while the data signal is subjected to multi-antenna detection in the multi-antenna receiving processor 558B to recover any first node 550B-targeted spatial stream. Symbols on each spatial stream are demodulated and recovered in the receiving processor 556B to generate a soft decision. Then the receiving processor 556B decodes and de-interleaves the soft decision to recover the higher-layer data and control signal transmitted by the other UE 510B on the physical channel. Next, the higher-layer data and control signal are provided to the controller/processor 559B. The controller/processor 559B provides functions of the L2 layer. The controller/processor 559B can be associated with the memory 560B that stores program code and data. The memory 560B can be called a computer readable medium. In a transmission from the other UE 510B to the first node 550B, the controller/processor 559B provides multiplexing between a transport channel and a logical channel, packet reassembling, decryption, header decompression and control signal processing so as to recover a higher-layer packet from the other UE 510B. The higher-layer packet is later provided to all protocol layers above the L2 layer. Or various control signals can be provided to the L3 for processing.

In a transmission from the first node 550B to the other UE 510B, at the first node 550B, the data source 567B is used to provide a higher-layer packet to the controller/processor 559B. The data source 567B represents all protocol layers above the L2 layer. Similar to a transmitting function of the other UE 510B described in the transmission from the other UE 510B to the first node 550B, the controller/processor 559B performs header compression, encryption, packet segmentation and reordering, and multiplexing between a logical channel and a transport channel so as to provide the L2 layer functions used for the user plane and the control plane. The controller/processor 559B is also responsible for a retransmission of a lost packet, and a signaling to the other UE 510B. The transmitting processor 568B performs modulation and mapping, as well as channel coding, and the multi-antenna transmitting processor 557B performs digital multi-antenna spatial precoding, including codebook-based precoding and non-codebook-based precoding, and beamforming. The transmitting processor 568B then modulates generated spatial streams into multicarrier/single-carrier symbol streams. The modulated symbol streams, after being subjected to analog precoding/beamforming in the multi-antenna transmitting processor 557B, are provided from the transmitter 554B to each antenna 552B. Each transmitter 554B first converts a baseband symbol stream provided by the multi-antenna transmitting processor 557B into a radio frequency symbol stream, and then provides the radio frequency symbol stream to the antenna 552B.

In a transmission from the first node 550B to the other UE 510B, the function of the other UE 510B is similar to the receiving function of the first communication device 550B described in the transmission from the other UE 510B to the first node 550B. Each receiver 518B receives a radio frequency signal via a corresponding antenna 520B, converts the received radio frequency signal into a baseband signal, and provides the baseband signal to the multi-antenna receiving processor 572B and the receiving processor 570B. The receiving processor 570B and the multi-antenna receiving processor 572B jointly provide functions of the L1 layer. The controller/processor 575B provides functions of the L2 layer. The controller/processor 575B can be associated with the memory 576B that stores program code and data. The memory 576B can be called a computer readable medium. In the transmission from the first node 550B to the other UE 510B, the controller/processor 575B provides de-multiplexing between a transport channel and a logical channel, packet reassembling, decrypting, header decompression, control signal processing so as to recover a higher-layer packet from the first node 550B. The higher-layer packet from the controller/processor 575B can be provided to all protocol layers above the L2 layer. Or various control signals can be provided to the L3 for processing.

In one embodiment, the other UE 510B is a UE supporting V2X.

In one embodiment, the other UE 510B is a UE supporting D2D.

In one embodiment, the other UE 510B is vehicle-mounted equipment.

In one embodiment, the other UE 510B is an RSU.

In one embodiment, the antenna 552B, the transmitter 554B, the multi-antenna transmitting processor 557B, the transmitting processor 568B, and the controller/processor 559B are used for transmitting the second MAC PDU in the present application.

In one embodiment, the antenna 520B, the receiver 518B, the multi-antenna receiving processor 572B, the receiving processor 570B, and the controller/processor 575B are used for receiving the second MAC PDU in the present application.

Embodiment 6A

Figure 6A:
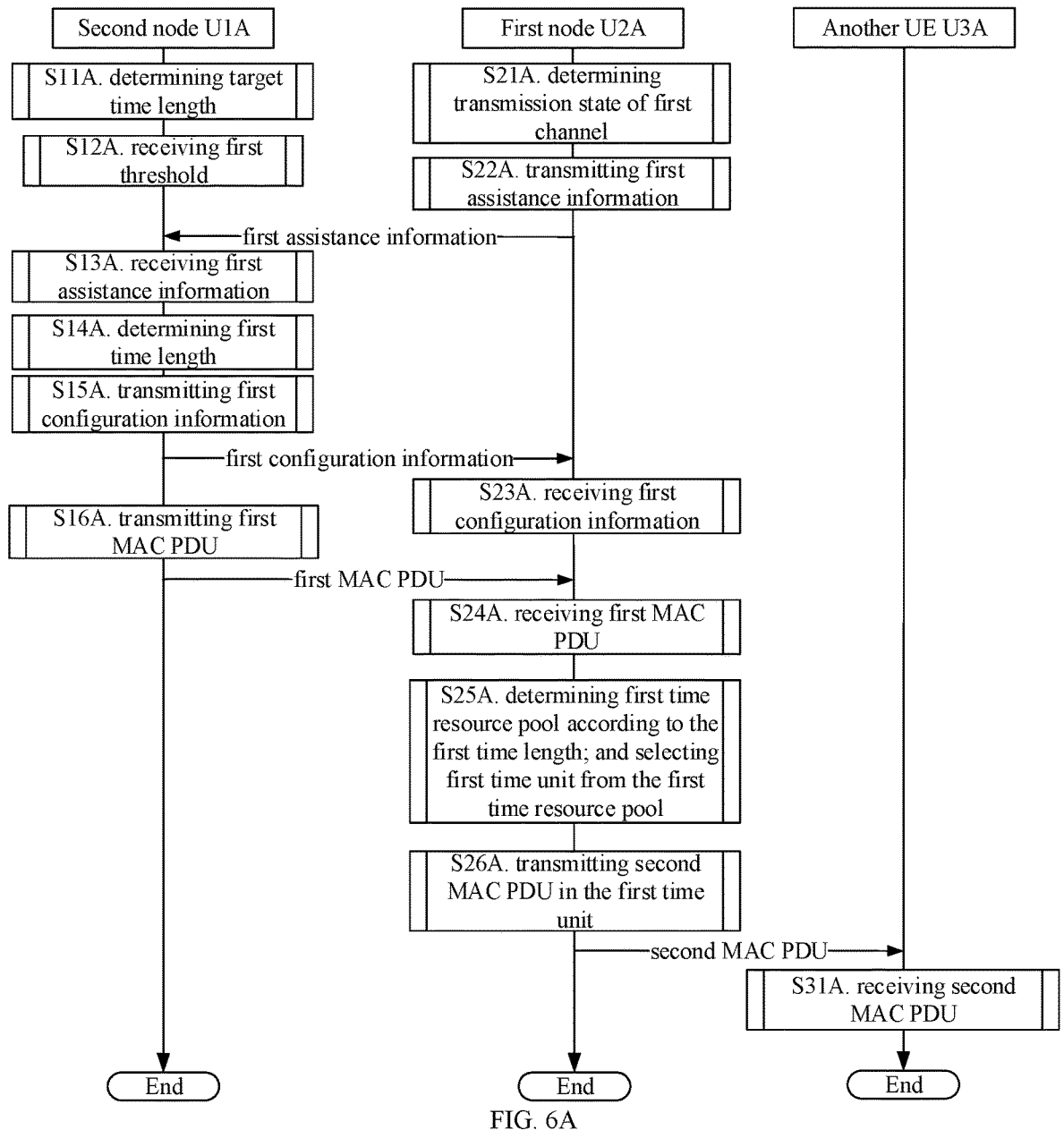
FIG. 6A illustrates a flowchart of radio signal transmission according to one embodiment of the present application.

Embodiment 6A illustrates a flowchart of radio signal transmission according to one embodiment of the present application, as shown in FIG. 6A. In FIG. 6A, a first node U2A and a second node U1A are in communication via a sidelink interface, while the first node U2A and another UE U3A are in communication via a sidelink interface. It should be particularly noted that the sequence illustrated herein does not set any limit to the signal transmission order or implementation order in the present application.

The second node U1A determines a target time length in step S11A; receives a first threshold in step S12A; and receives first assistance information in step S13A; determines a first time length in step S14A; transmits first configuration information in step S15A; and transmits a first MAC PDU in step S16A.

The first node U2A determines a transmission state of a first channel in step S21A; transmits first assistance information in step S22A; and receives a first configuration information set in step S23A; receives a first MAC PDU in step S24A; determines a first time resource pool according to the first time length, and selects a first time unit from the first time resource pool in step S25A; and transmits a second MAC PDU in the first time unit in step S26A.

The other UE U3A receives a second MAC PDU in step S31A.

In Embodiment 6A, transmitting first assistance information, the first assistance information indicating a transmission state of a first channel; and
receiving first configuration information, the first configuration information indicating a first time length; and receiving a first MAC PDU, the first MAC PDU comprising a first MAC subPDU, the first MAC subPDU comprising a first MAC SDU; selecting a first time unit from a first time resource pool; and transmitting a second MAC PDU in the first time unit; herein, the first assistance information is used for generating the first configuration information, and the second MAC PDU comprises at least partial bits in the first MAC SDU; the first channel connects the first node to a target receiver receiving the second MAC PDU; a second channel connects a transmitter transmitting the first MAC PDU to the first node; the transmitter transmitting the first MAC PDU and the target receiver receiving the second MAC PDU are Non-Co-located; the first time length is used to determine the first time resource pool; determining the first time resource pool in a lower layer according to the first time length; where a time length of the first time resource pool is no greater than the first time length; and reporting the first time resource pool to a higher layer of the first node; a time interval from a last time unit in the first time resource pool to a time of receiving the first MAC SDU does not exceed the first time length; a target time length being determined, and a first threshold being received; where a difference between the transmission state of the first channel and a transmission state of the second channel is no smaller than the first threshold; the first time length is no greater than the target time length; a delay after the first MAC SDU being transmitted through the second channel and the first channel being no greater than the target time length; the first time unit being any time unit in the first time resource pool; herein, the first time resource pool comprises at least one time unit.

In one embodiment, the second node determines the target time length according to the traffic flow to which the first MAC SDU belongs.

In one embodiment, the second node determines the target time length according to the QoS flow to which the first MAC SDU belongs.

In one embodiment, the second node determines the target time length according to the PC5 QoS flow to which the first MAC SDU belongs.

In one embodiment, the PC5 QoS flow to which the first MAC SDU belongs corresponds to a first QoS parameter group, the first QoS parameter group indicating the target time length.

In one embodiment, the target time length is determined in a V2X layer of the second node.

In one embodiment, the target time length is transmitted from the V2X layer of the second node to an Access Stratum (AS) of the second node.

In one embodiment, a serving base station for the second node determines the target time length according to the QoS flow to which the first MAC SDU belongs.

In one embodiment, the second node receives RRC configuration information transmitted by the serving base station for the second node, the RRC configuration information comprising the target time length.

In one embodiment, the target time length is measured in slots.

In one embodiment, the target time length is measured in subframes.

In one embodiment, the target time length is measured in milliseconds (ms).

In one embodiment, the target time length comprises a positive integer number of slot(s).

In one embodiment, the target time length comprises a positive integer number of sidelink slot(s).

In one embodiment, the target time length comprises a positive integer number of sub-frame(s).

In one embodiment, the second node receives second information, the second information indicating the first threshold.

In one embodiment, the second information is transmitted to the second node by a serving base station for the second node.

In one embodiment, the second information is transmitted from an upper layer of the second node to a lower layer of the second node.

In one embodiment, the second information is transmitted from a V2X layer of the second node to an Access Stratum (AS) of the second node.

In one embodiment, the second information is transmitted from an RRC layer of the second node to a MAC layer of the second node.

In one embodiment, the second information is transmitted in a downlink.

In one embodiment, the second information is transmitted by unicast.

In one embodiment, the second information comprises RRC layer information.

In one embodiment, the first threshold is all or partial IEs in an RRC signaling.

In one embodiment, the first threshold is all or partial fields in an IE in an RRC signaling.

In one embodiment, the first threshold is configured by the network.

In one embodiment, the first threshold is pre-configured.

In one embodiment, the first threshold is pre-specified.

In one embodiment, the first threshold is determined by UE implementation.

In one embodiment, the first threshold is a threshold comprised in a threshold list.

In one embodiment, the transmission state of the first channel is obtained by monitoring a transmission state of a packet belonging to the first channel within a first time interval.

In one embodiment, the first time interval is configured by the network.

In one embodiment, the first time interval is pre-configured.

In one embodiment, the first time interval is pre-specified.

In one embodiment, the first time interval is measured in slots.

In one embodiment, the first time interval is measured in subframes.

In one embodiment, the first time interval is measured in milliseconds (ms).

In one embodiment, the first time interval comprises a positive integer number of slot(s).

In one embodiment, the first time interval comprises a positive integer number of sidelink slot(s).

In one embodiment, the first time interval comprises a positive integer number of sub-frame(s).

In one embodiment, an end of the first time interval is earlier than a time of transmitting the first assistance information.

In one embodiment, the transmission state of the first channel comprises a first ARQ success rate of transmitting a packet belonging to the first channel within the first time interval.

In one embodiment, the first ARQ success rate includes: transmitting via an ARQ a total of P11 said packets belonging to the first channel within the first time interval, and receiving an ACK feedback for Q11 said packets belonging to the first channel, where a quotient of the Q11 being divided by the P11 is the first ARQ success rate.

In one embodiment, the transmission state of the first channel comprises a first HARQ success rate of transmitting the packet belonging to the first channel within the first time interval.

In one embodiment, the first HARQ success rate includes: transmitting via a HARQ a total of P12 said packets belonging to the first channel within the first time interval, and receiving an ACK feedback for Q12 said packets belonging to the first channel, where a quotient of the Q12 being divided by the P12 is the first HARQ success rate.

In one embodiment, the transmission state of the first channel comprises a first ARQ Packet Loss Rate of transmitting the packet belonging to the first channel within the first time interval.

In one embodiment, the first ARQ Packet Loss Rate includes: transmitting via an ARQ a total of P13 said packets belonging to the first channel within the first time interval, and receiving a NACK feedback for Q13 said packets belonging to the first channel, where a quotient of the Q13 being divided by the P13 is the first ARQ Packet Loss Rate.

In one embodiment, the transmission state of the first channel comprises a first HARQ Packet Loss Rate of transmitting the packet belonging to the first channel within the first time interval.

In one embodiment, the first HARQ Packet Loss Rate includes: transmitting via a HARQ a total of P14 said packets belonging to the first channel within the first time interval, and receiving a NACK feedback for Q14 said packets belonging to the first channel, where a quotient of the Q14 being divided by the P14 is the first HARQ Packet Loss Rate.

In one embodiment, the transmission state of the first channel comprises a first Discontinuous Transmission (DTX) rate of transmitting the packet belonging to the first channel within the first time interval.

In one embodiment, the first DTX rate includes: transmitting via a HARQ a total of P15 said packets belonging to the first channel within the first time interval, and for Q15 said packets belonging to the first channel, the first node receiving neither an ACK nor a NACK feedback, where a quotient of the Q15 being divided by the P15 is the first DTX rate.

In one embodiment, the ARQ transmission is done in the RLC layer of the first node.

In one embodiment, the HARQ transmission is done in the MAC layer of the first node.

In one embodiment, the transmission state of the first channel comprises a first Channel Occupancy Ratio (CR) rate of transmitting the packet belonging to the first channel within the first time interval.

In one embodiment, the transmission state of the first channel includes a first average number of resource selection times of selecting a first available time-frequency resource set as the packet belonging to the first channel within the first time interval is transmitted in a lower layer.

In one embodiment, the first average number of resource selection times includes: transmitting a total of K said packets belonging to the first channel within the first time interval; when transmitting a first packet among the K said packets belonging to the first channel, the number of resource selection times of selecting the first available time-frequency resource set in the lower layer is n1, where any available time-frequency resource in the first available time-frequency resource set can be used for transmitting the first one among the K said packets belonging to the first channel; when transmitting a second one among the K said packets belonging to the first channel, the number of resource selection times of selecting the first available time-frequency resource set in the lower layer is n2, where any available time-frequency resource in the first available time-frequency resource set can be used for transmitting the second one among the K said packets belonging to the first channel; and so on; the first average number of resource selection times is a quotient of (n1+n2+ . . . +nK) being divided by K.

In one embodiment, the packet belonging to the first channel comprises a PDCP SDU.

In one embodiment, the packet belonging to the first channel comprises a PDCP PDU.

In one embodiment, the packet belonging to the first channel comprises an RLC SDU.

In one embodiment, the packet belonging to the first channel comprises an RLC PDU.

In one embodiment, the packet belonging to the first channel comprises a MAC SDU.

In one embodiment, the packet belonging to the first channel comprises a MAC PDU.

In one embodiment, a transmission state of the second channel is obtained within a first time interval.

In one embodiment, the transmission state of the second channel comprises a second ARQ success rate of transmitting a packet belonging to the second channel within the first time interval.

In one embodiment, the second ARQ success rate includes: transmitting via an ARQ a total of P21 said packets belonging to the second channel within the first time interval, and receiving an ACK feedback for Q21 said packets belonging to the second channel, where a quotient of the Q21 being divided by the P21 is the second ARQ success rate.

In one embodiment, the transmission state of the second channel comprises a second HARQ success rate of transmitting the packet belonging to the second channel within the first time interval.

In one embodiment, the second HARQ success rate includes: transmitting via a HARQ a total of P22 said packets belonging to the second channel within the first time interval, and receiving an ACK feedback for Q22 said packets belonging to the second channel, where a quotient of the Q22 being divided by the P22 is the second HARQ success rate.

In one embodiment, the transmission state of the second channel comprises a second ARQ Packet Loss Rate of transmitting the packet belonging to the second channel within the first time interval.

In one embodiment, the second ARQ Packet Loss Rate includes: transmitting via an ARQ a total of P23 said packets belonging to the second channel within the first time interval, and receiving a NACK feedback for Q23 said packets belonging to the second channel, where a quotient of the Q23 being divided by the P23 is the second ARQ Packet Loss Rate.

In one embodiment, the transmission state of the second channel comprises a second HARQ Packet Loss Rate of transmitting the packet belonging to the second channel within the first time interval.

In one embodiment, the second HARQ Packet Loss Rate includes: transmitting via a HARQ a total of P24 said packets belonging to the second channel within the first time interval, and receiving a NACK feedback for Q24 said packets belonging to the second channel, where a quotient of the Q24 being divided by the P24 is the second HARQ Packet Loss Rate.

In one embodiment, the transmission state of the second channel comprises a second Discontinuous Transmission (DTX) rate of transmitting the packet belonging to the second channel within the first time interval.

In one embodiment, the second DTX rate includes: transmitting via a HARQ a total of P25 said packets belonging to the second channel within the second time interval, and for Q25 said packets belonging to the second channel, the transmitting-end receiving neither an ACK nor a NACK feedback, where a quotient of the Q25 being divided by the P25 is the second DTX rate.

In one embodiment, the transmission state of the second channel comprises a second Channel Occupancy Ratio (CR) rate of transmitting the packet belonging to the second channel within the first time interval.

In one embodiment, the transmission state of the second channel includes a second average number of resource selection times of selecting a second available time-frequency resource set as the packet belonging to the second channel within the first time interval is transmitted in a lower layer.

In one embodiment, the second average number of resource selection times includes: transmitting a total of L said packets belonging to the second channel within the first time interval; when transmitting a first packet among the L said packets belonging to the second channel, the number of resource selection times of selecting the second available time-frequency resource set in the lower layer is m1, where any available time-frequency resource in the second available time-frequency resource set can be used for transmitting the first one among the L said packets belonging to the second channel; when transmitting a second one among the L said packets belonging to the second channel, the number of resource selection times of selecting the second available time-frequency resource set in the lower layer is m2, where any available time-frequency resource in the second available time-frequency resource set can be used for transmitting the second one among the L said packets belonging to the second channel; and so on; the second average number of resource selection times is a quotient of (m1+m2+ . . . +mL) being divided by L.

In one embodiment, the packet belonging to the second channel comprises a PDCP SDU.

In one embodiment, the packet belonging to the second channel comprises a PDCP PDU.

In one embodiment, the packet belonging to the second channel comprises an RLC SDU.

In one embodiment, the packet belonging to the second channel comprises an RLC PDU.

In one embodiment, the packet belonging to the second channel comprises a MAC SDU.

In one embodiment, the packet belonging to the second channel comprises a MAC PDU.

In one embodiment, a difference between the transmission state of the first channel and the transmission state of the second channel is no smaller than a first threshold, the first time length being determined based on the difference between the transmission state of the first channel and the transmission state of the second channel.

In one embodiment, when the transmission state of the first channel is better than the transmission state of the second channel, and a difference between the transmission state of the first channel and the transmission state of the second channel is no smaller than the first threshold, the first time length's value is smaller than the second time length's.

In one embodiment, when the transmission state of the first channel is better than the transmission state of the second channel, and a difference between the transmission state of the first channel and the transmission state of the second channel is no smaller than the first threshold, the first delay increment is a negative value.

In one embodiment, the value of the first time length is a sum of values of the second time length and the first delay increment.

In one subembodiment, when the sum of the value of the second time length and the value of the first delay increment is smaller than a second threshold, the first time length is the second threshold.

In one embodiment, when the transmission state of the first channel is better than the transmission state of the second channel, and a difference between the transmission state of the first channel and the transmission state of the second channel is no smaller than the first threshold, the indication of Increase or Decrease means decreasing.

In one embodiment, when the indication of Increase or Decrease comprised in the first configuration information means decreasing, the value of the first time length is a difference between the value of the second time length and the value of a second delay increment.

In one subembodiment, when the difference between the value of the second time length and the value of the second delay increment is smaller than the second threshold, the first time length is the second threshold.

In one embodiment, the second threshold is configured by the network.

In one embodiment, the second threshold is pre-configured.

In one embodiment, the second threshold is pre-specified.

In one embodiment, the second threshold is determined by UE implementation.

In one embodiment, the second time length is measured in slots.

In one embodiment, the second time length is measured in subframes.

In one embodiment, the second time length is measured in milliseconds (ms).

In one embodiment, the second time length comprises a positive integer number of slot(s).

In one embodiment, the second time length comprises a positive integer number of sidelink slot(s).

In one embodiment, the second time length comprises a positive integer number of sub-frame(s).

In one embodiment, the second delay increment is a fixed value.

In one embodiment, the second delay increment is configured by the network.

In one embodiment, the second delay increment is pre-configured.

In one embodiment, the second delay increment is pre-specified.

In one embodiment, the second delay increment comprises a fixed number of slots.

In one embodiment, the second delay increment comprises a fixed number of sidelink slots.

In one embodiment, the second time length is used to determine a third time resource pool in the first time interval; a length of the third time resource pool is no greater than the second time length; the first time interval comprises the third time resource pool.

In one embodiment, receiving a third MAC PDU, the third MAC PDU comprising a third MAC subPDU, the third MAC subPDU comprising a third MAC SDU; selecting a second time unit from the third time resource pool, the second time unit being used for transmitting a fourth MAC PDU, the fourth MAC PDU comprising at least partial bits in the third MAC SDU, the third MAC SDU belonging to the QoS flow to which the first MAC SDU belongs.

In one embodiment, a time interval from a last time unit in the third time resource pool to a time of receiving the third MAC SDU does not exceed the second time length.

In one embodiment, the second time length is no greater than the target time length.

In one embodiment, the second time length is applied to the first channel in the first time interval.

In one embodiment, the action of determining the first time length comprises: at least one of determining the first time length, determining the first delay increment or determining the indication of Increase or Decrease; the action of determining the first time length is performed in the second node.

In one embodiment, the transmission state of the first channel being better than the transmission state of the second channel includes: a difference between the first ARQ success rate and the second ARQ success rate is greater than 0.

In one embodiment, a difference between the transmission state of the first channel and a transmission state of the second channel includes: a difference between the first ARQ success rate and the second ARQ success rate.

In one embodiment, the transmission state of the first channel being better than the transmission state of the second channel includes: a quotient of the first ARQ success rate and the second ARQ success rate is greater than 1.

In one embodiment, a difference between the transmission state of the first channel and a transmission state of the second channel includes: a quotient of the first ARQ success rate and the second ARQ success rate.

In one embodiment, the transmission state of the first channel being better than the transmission state of the second channel includes: a difference between the first HARQ success rate and the second HARQ success rate is greater than 0.

In one embodiment, a difference between the transmission state of the first channel and a transmission state of the second channel includes: a difference between the first HARQ success rate and the second HARQ success rate.

In one embodiment, the transmission state of the first channel being better than the transmission state of the second channel includes: a quotient of the first HARQ success rate and the second HARQ success rate is greater than 1.

In one embodiment, a difference between the transmission state of the first channel and a transmission state of the second channel includes: a quotient of the first HARQ success rate and the second HARQ success rate.

In one embodiment, when the transmission state of the first channel is worse than the transmission state of the second channel, and a difference between the transmission state of the first channel and the transmission state of the second channel is no smaller than the first threshold, the first time length is larger than the second time length.

In one embodiment, when the transmission state of the first channel is worse than the transmission state of the second channel, and a difference between the transmission state of the first channel and the transmission state of the second channel is no smaller than the first threshold, the first delay increment is a positive value.

In one embodiment, when the transmission state of the first channel is worse than the transmission state of the second channel, and a difference between the transmission state of the first channel and the transmission state of the second channel is no smaller than the first threshold, the indication of Increase or Decrease means increasing.

In one embodiment, the value of the first time length is a sum of values of the second time length and the second delay increment.

In one embodiment, the transmission state of the first channel being worse than the transmission state of the second channel includes: a difference between the first ARQ packet loss rate and the second ARQ packet loss rate is greater than 0.

In one embodiment, a difference between the transmission state of the first channel and a transmission state of the second channel includes: a difference between the first ARQ packet loss rate and the second ARQ packet loss rate.

In one embodiment, the transmission state of the first channel being worse than the transmission state of the second channel includes: a quotient of the first ARQ packet loss rate and the second ARQ packet loss rate is greater than 1.

In one embodiment, a difference between the transmission state of the first channel and a transmission state of the second channel includes: a quotient of the first ARQ packet loss rate and the second ARQ packet loss rate.

In one embodiment, the transmission state of the first channel being worse than the transmission state of the second channel includes: a difference between the first HARQ packet loss rate and the second HARQ packet loss rate is greater than 0.

In one embodiment, a difference between the transmission state of the first channel and a transmission state of the second channel includes: a difference between the first HARQ packet loss rate and the second HARQ packet loss rate.

In one embodiment, the transmission state of the first channel being worse than the transmission state of the second channel includes: a quotient of the first HARQ packet loss rate and the second HARQ packet loss rate is greater than 1.

In one embodiment, a difference between the transmission state of the first channel and a transmission state of the second channel includes: a quotient of the first HARQ packet loss rate and the second HARQ packet loss rate.

In one embodiment, the transmission state of the first channel being worse than the transmission state of the second channel includes: a difference between the first DTX rate and the second DTX rate is greater than 0.

In one embodiment, a difference between the transmission state of the first channel and a transmission state of the second channel includes: a difference between the first DTX rate and the second DTX rate.

In one embodiment, the transmission state of the first channel being worse than the transmission state of the second channel includes: a quotient of the first DTX rate and the second DTX rate is greater than 1.

In one embodiment, a difference between the transmission state of the first channel and a transmission state of the second channel includes: a quotient of the first DTX rate and the second DTX rate.

In one embodiment, the transmission state of the first channel being worse than the transmission state of the second channel includes: a difference between the first Channel Occupancy Ratio (CR) and the second Channel Occupancy Ratio (CR) is greater than 0.

In one embodiment, a difference between the transmission state of the first channel and a transmission state of the second channel includes: a difference between the first Channel Occupancy Ratio (CR) and the second Channel Occupancy Ratio (CR).

In one embodiment, the transmission state of the first channel being worse than the transmission state of the second channel includes: a quotient of the first Channel Occupancy Ratio (CR) and the second Channel Occupancy Ratio (CR) is greater than 1.

In one embodiment, a difference between the transmission state of the first channel and a transmission state of the second channel includes: a quotient of the first Channel Occupancy Ratio (CR) and the second Channel Occupancy Ratio (CR).

In one embodiment, the transmission state of the first channel being worse than the transmission state of the second channel includes: a difference between the first average number of resource selection times and the second average number of resource selection times is greater than 0.

In one embodiment, a difference between the transmission state of the first channel and a transmission state of the second channel includes: a difference between the first average number of resource selection times and the second average number of resource selection times.

In one embodiment, the transmission state of the first channel being worse than the transmission state of the second channel includes: a quotient of the first average number of resource selection times and the second average number of resource selection times is greater than 1.

In one embodiment, a difference between the transmission state of the first channel and a transmission state of the second channel includes: a quotient of the first average number of resource selection times and the second average number of resource selection times.

In one embodiment, the first time length is determined in a V2X layer.

In one embodiment, the first time length is determined in an RRC layer.

In one embodiment, the first time length is determined in a higher layer.

In one embodiment, the first time length is determined in the second node.

In one embodiment, the first time length is transmitted from a higher layer of the first node to a lower layer of the first node.

In one embodiment, the first time length is transmitted from an RRC layer of the first node to a lower layer of the first node.

In one embodiment, the first time resource pool comprises all sidelink slots that comprise available frequency-domain units within the first time length.

In one embodiment, the frequency-domain unit comprises at least one Resource Block (RB).

In one embodiment, the frequency-domain unit comprises at least one subchannel.

In one embodiment, the frequency-domain unit comprises a positive integer number of subchannel(s), where the number of the subchannel(s) is the same as that for transmitting the second MAC PDU.

In one embodiment, the frequency-domain unit comprises a positive integer number of RB(s), where the number of the RB(s) is the same as that for transmitting the second MAC PDU.

In one embodiment, the available frequency-domain unit belongs to the frequency-domain unit, where the available frequency-domain unit can be used for transmitting the second MAC PDU.

In one embodiment, the action of determining the first time resource pool comprises: the first node determining a second time resource pool according to the first time length, and performing channel sensing to determine the first time resource pool in the second time resource pool.

In one embodiment, the channel sensing is performed in a lower layer.

In one embodiment, the channel sensing includes energy detection.

In one embodiment, the channel sensing includes signature sequence detection.

In one embodiment, the channel sensing includes Cyclic Redundancy Check (CRC).

In one embodiment, the channel sensing includes measuring a Reference Signal Receive Power (RSRP).

In one embodiment, the channel sensing includes receiving a Physical Sidelink Control Channel (PSCCH).

In one embodiment, the channel sensing includes receiving Sidelink Control Information (SCI).

In one embodiment, the channel sensing includes receiving a SCI format 0-1.

In one embodiment, the channel sensing includes detection on a Sidelink-Received Signal Strength Indicator (S-RSSI).

In one embodiment, the channel sensing includes receiving SCI and measuring an RSRP.

In one embodiment, the first time resource pool comprises all sidelink slots that comprise the available frequency-domain units in the second time resource pool.

In one embodiment, the action of determining the first time resource pool comprises: Step1) a first time-frequency resource pool comprises all the frequency-domain units in the second time resource pool; Step2) the first node receives SCI in a lower layer within a second time interval, the SCI indicating a priority and reserved time-frequency resources of a packet scheduled by the SCI; an end of the second time interval is no later than a start of the slot n; a value of the second time interval is pre-specified, which is one of 100 slots or 1100 slots; Step3) the first node measures an RSRP of a PSSCH scheduled by the SCI in a lower layer; Step4) if the RSRP is greater than a third threshold, it is indicated by the SCI that frequency-domain units reserved that are comprised in the first time-frequency resource pool and the same as those occupied by the PSSCH will be removed from the first time-frequency resource pool; Step5) if the number of the frequency-domain units left over in the first time-frequency resource pool is smaller than 0.2 multiples of the total number of the frequency-domain units in the second time resource pool, increment the third threshold by 3 dB and restart performing step2); Step6) S-RSSI is calculated for the frequency-domain units left over in the first time-frequency resource pool; Step7) the frequency-domain units left over in the first time-frequency resource pool are moved to a second time-frequency resource pool according to an ascending order of S-RSSI till a number of the frequency-domain units comprised in the second time-frequency resource pool is no smaller than 0.2 multiples of the total number of the frequency-domain units in the second time resource pool.

In one subembodiment, the third threshold is determined by a priority of the packet scheduled by the SCI and a priority of the second MAC PDU.

In one subembodiment, if step5) is not performed, the number of resource selection times of selecting the second time-frequency resource pool is counted as 1.

In one subembodiment, if step5) is performed once, the number of resource selection times of selecting the second time-frequency resource pool is counted as 2.

In one subembodiment, if step5) is performed twice, the number of resource selection times of selecting the second time-frequency resource pool is counted as 3; and so on, hence no need to give unnecessary details.

In one subembodiment, any frequency-domain unit in the second time-frequency resource pool is the available frequency-domain unit.

In one embodiment, the second time-frequency resource pool comprises all the available frequency-domain units in the second time resource pool.

In one embodiment, the first time resource pool consists of all the sidelink slots that comprise the available frequency-domain units in the second time resource pool.

In one embodiment, a length of the second time resource pool is no greater than the first time length.

In one embodiment, a length of the first time resource pool is no greater than the second time resource pool.

In one embodiment, the action of reporting the first time resource pool to a higher layer of the first node comprises: reporting all the available frequency-domain units in the first time resource pool to a higher layer of the first node.

In one embodiment, the action of reporting the first time resource pool to a higher layer of the first node comprises: reporting all the available frequency-domain units in the first time resource pool and sidelink slots to which the available frequency-domain units are comprised to a higher layer of the first node.

In one embodiment, the action of reporting the first time resource pool to a higher layer of the first node comprises: reporting an index list in the first time resource pool to a higher layer of the first node, where any index in the index list indicates one available frequency-domain unit in the first time resource pool and a sidelink slot to which the available frequency-domain unit is comprised.

In one embodiment, the first time resource pool comprises S sidelink slot(s), S being a positive integer.

In one embodiment, the first time unit is a first sidelink slot in the first time resource pool.

In one embodiment, the first time unit is a last sidelink slot in the first time resource pool.

In one embodiment, the first time unit comprises the M sidelink slot(s) comprised in the first time resource pool.

In one embodiment, the first time unit is any sidelink slot comprised in the first time resource pool at an equal probability.

In one embodiment, the first time unit is a sidelink slot chosen by the higher layer of the first node at random from the first time resource pool.

In one embodiment, the first time unit comprises the M sidelink slot(s) chosen by the higher layer of the first node at random from the first time resource pool.

In one embodiment, a time interval from a last sidelink slot in the first time resource pool to a time of receiving the first MAC SDU does not exceed the first time length.

In one embodiment, a time interval from a last sidelink slot comprised in a last time unit in the first time resource pool to a time of receiving the first MAC SDU does not exceed the first time length.

In one embodiment, the first time length is smaller than the target time length.

Embodiment 6B

Figure 6B:
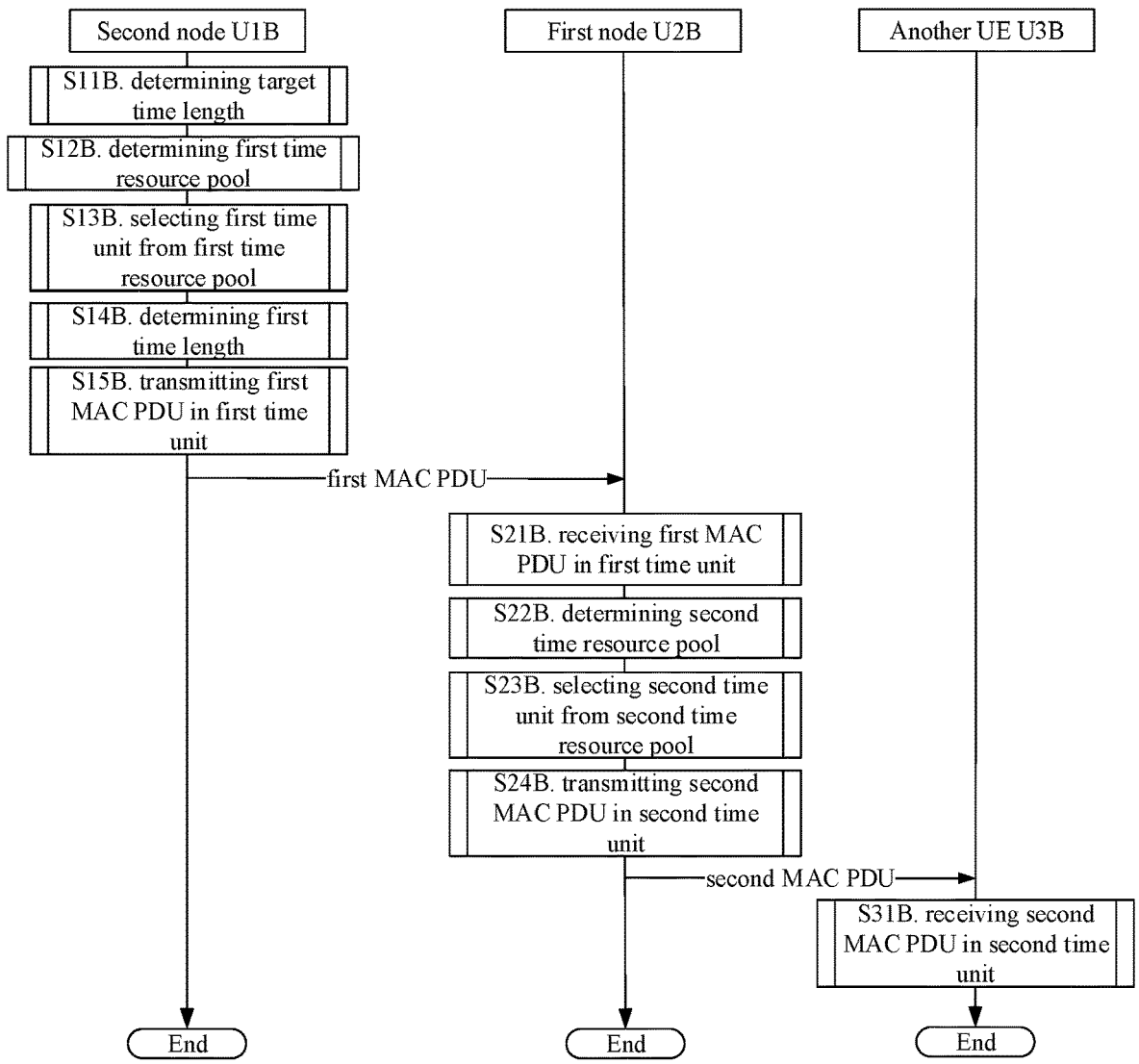
FIG. 6B illustrates a flowchart of radio signal transmission according to one embodiment of the present application.

Embodiment 6B illustrates a flowchart of radio signal transmission according to one embodiment of the present application, as shown in FIG. 6B. In FIG. 6B, a first node U2B and a second node U1B are in communication via a sidelink interface, while the first node U2B and another UE U3B are in communication via a sidelink interface. It should be particularly noted that the sequence illustrated herein does not set any limit to the signal transmission order or implementation order in the present application.

The second node U1B determines a target time length in step S11B; and determines a first time resource pool in step S12B; selects a first time unit from a first time resource pool in step S13B; determines a first time length in step S14B; and transmits a first MAC PDU in the first time unit in step S15B.

The first node U2B receives a first MAC PDU in a first time unit in step S21B; and determines a second time resource pool in step S22B; selects a second time unit from a second time resource pool in step S23B; and transmits a second MAC PDU in the second time unit in step S24B.

The other UE U3B receives a second MAC PDU in a second time unit in step S31B.

In Embodiment 6B, receiving a first MAC PDU in a first time unit; and selecting a second time unit from a second time resource pool; and transmitting a second MAC PDU in the second time unit; herein, the first MAC PDU comprises a first MAC subPDU, the first MAC subPDU comprising a first MAC subheader and a first MAC SDU; the first MAC subheader indicates a first time length; the first time length is used to determine the second time resource pool; the second MAC PDU comprises at least partial bits in the first MAC SDU; the first time length is dependent on a position of the first time unit; the first time unit being selected from a first time resource pool; a sum of a duration of the first time resource pool and a duration of the second time resource pool does not exceed a target time length, the target time length being determined by a transmitter transmitting the first MAC SDU; a sum of the first time length and a time interval from the first time unit to a time of generating the first MAC SDU is no greater than the target time length; determining the second time resource pool in a lower layer according to the first time length; and reporting the second time resource pool to a higher layer of the first node; a time interval from a last time unit in the second time resource pool to a time of receiving the first MAC SDU does not exceed the first time length; a first channel connects a transmitter transmitting the first MAC PDU to the first node; the second channel connects the first node to a target receiver receiving the second MAC PDU; the transmitter transmitting the first MAC PDU and the target receiver receiving the second MAC PDU are Non-Co-located.

In one embodiment, a transmitter of the first MAC SDU is the second node.

In one embodiment, the second node determines the target time length according to the traffic flow to which the first MAC SDU belongs.

In one embodiment, the second node determines the target time length according to the QoS flow to which the first MAC SDU belongs.

In one embodiment, the second node determines the target time length according to the PC5 QoS flow to which the first MAC SDU belongs.

In one embodiment, the PC5 QoS flow to which the first MAC SDU belongs corresponds to a first QoS parameter group, the first QoS parameter group indicating the target time length.

In one embodiment, the target time length is determined in a Non-Access Stratum (NAS) of the second node.

In one embodiment, the target time length is determined in a V2X layer of the second node.

In one embodiment, the target time length is determined in a control plane of the second node.

In one embodiment, the target time length is transmitted to an AS of the second node.

In one embodiment, the target time length is measured in slots.

In one embodiment, the target time length is measured in subframes.

In one embodiment, the target time length is measured in milliseconds (ms).

In one embodiment, the target time length comprises a positive integer number of slot(s).

In one embodiment, the target time length comprises a positive integer number of sidelink slot(s).

In one embodiment, the target time length comprises a positive integer number of sub-frame(s).

In one embodiment, a second length is transmitted from an upper layer of the second node to a lower layer of the second node.

In one embodiment, the second time length is transmitted from a V2X layer of the second node to an Access Stratum (AS) of the second node.

In one embodiment, the second time length is transmitted from an RRC layer of the second node to a MAC layer of the second node.

In one embodiment, the second time length is configured by the network.

In one embodiment, the second time length is pre-configured.

In one embodiment, the second time length is pre-specified.

In one embodiment, the second time length is determined by UE implementation.

In one embodiment, the second time length is determined in a V2X layer of the second node.

In one embodiment, the second time length is transmitted from a MAC layer of the second node to a PHY layer of the second node.

In one embodiment, the first time resource pool comprises all sidelink slots that comprise candidate frequency-domain units within the second time length.

In one embodiment, the candidate frequency-domain unit comprises at least one Resource Block (RB).

In one embodiment, the candidate frequency-domain unit comprises at least one subchannel.

In one embodiment, the candidate frequency-domain unit comprises a positive integer number of subchannel(s), where the number of the subchannel(s) comprised in the candidate frequency-domain unit is the same as that for transmitting the first MAC PDU.

In one embodiment, the candidate frequency-domain unit comprises a positive integer number of RB(s), where the number of the RB(s) comprised in the candidate frequency-domain unit is the same as that for transmitting the first MAC PDU.

In one embodiment, the second node determines a third time resource pool according to the second time length, and performs channel sensing to determine the first time resource pool in the third time resource pool.

In one embodiment, any slot in the third time resource pool is reserved for the sidelink.

In one embodiment, partial slots in the third time resource pool are reserved for the sidelink.

In one embodiment, the third time resource pool belongs to a V2X resource pool.

In one embodiment, the action of determining the first time resource pool is done in a PHY layer of the second node.

In one embodiment, the channel sensing is performed in the lower layer.

In one embodiment, the channel sensing includes energy detection.

In one embodiment, the channel sensing includes signature sequence detection.

In one embodiment, the channel sensing includes Cyclic Redundancy Check (CRC).

In one embodiment, the channel sensing includes measuring a Reference Signal Receive Power (RSRP).

In one embodiment, the channel sensing includes receiving a Physical Sidelink Control Channel (PSCCH).

In one embodiment, the channel sensing includes receiving Sidelink Control Information (SCI).

In one embodiment, the channel sensing includes receiving a SCI format 0-1.

In one embodiment, the channel sensing includes detection on a Sidelink-Received Signal Strength Indicator (S-RSSI).

In one embodiment, the channel sensing includes receiving SCI and measuring an RSRP.

In one embodiment, the first time resource pool comprises all sidelink slots that comprise the candidate frequency-domain units in the third time resource pool.

In one embodiment, determining the first time resource pool in the third time resource pool comprises: determining a second time-frequency resource pool in the third time resource pool, the first time resource pool comprising all sidelink slots comprised in the second time-frequency resource pool.

In one embodiment, the action of determining the second time-frequency resource pool comprises:

Step1) a first time-frequency resource pool comprises all frequency-domain units in the third time resource pool;

Step2) the second node receives first SCI in a lower layer within a first time interval, the first SCI comprising any SCI received in a V2X resource pool, the first SCI indicating a priority and reserved time-frequency resources of a packet scheduled by the first SCI; an end of the first time interval is no later than a start of a slot k, where the slot k is a slot in which a higher layer of the second node requests the first time resource pool from the lower layer of the second node; a value of the first time interval is pre-specified, which is one of 100 slots or 1100 slots; Step3) the second node measures a first RSRP of a first PSSCH scheduled by the first SCI in the lower layer; Step4) if the first RSRP is greater than a first threshold, it is indicated by the first SCI that frequency-domain resources reserved that are comprised in the third time-frequency resource pool and the same as those occupied by the first PSSCH will be removed from the first time-frequency resource pool; Step5) if the number of the frequency-domain units left over in the first time-frequency resource pool is smaller than 0.2 multiples of the total number of the frequency-domain units in the third time resource pool, increment the first threshold by 3 dB and restart performing step2); Step6) S-RSSI is calculated for the frequency-domain units left over in the first time-frequency resource pool; Step7) the frequency-domain units left over in the first time-frequency resource pool are moved to the second time-frequency resource pool according to an ascending order of S-RSSI till a number of the frequency-domain units comprised in the second time-frequency resource pool is no smaller than 0.2 multiples of the total number of the frequency-domain units in the third time resource pool.

In one subembodiment, the first threshold is determined by a priority of the packet scheduled by the first SCI and a priority of the first MAC PDU.

In one subembodiment, any frequency-domain unit in the second time-frequency resource pool is the candidate frequency-domain unit.

In one embodiment, the second time-frequency resource pool comprises all the candidate frequency-domain units in the third time resource pool.

In one embodiment, a sidelink slot in which any candidate frequency-domain unit in the second time-frequency resource pool is comprised belongs to the third time resource pool.

In one embodiment, reporting the first time resource pool to the higher layer of the second node.

In one embodiment, reporting the candidate frequency-domain units comprised in the second time-frequency resource pool to the higher layer of the second node.

In one embodiment, reporting sidelink slots as well as all candidate frequency-domain units in the sidelink slots comprised in the first time resource pool to the higher layer of the second node.

In one embodiment, reporting a first index list to the higher layer of the second node, where any index in the first index list indicates a sidelink slot as well as a candidate frequency-domain unit in the sidelink slot comprised in the first time resource pool.

In one embodiment, the first time unit is selected from the first time resource pool by the higher layer of the second node.

In one embodiment, the first time unit is a first one of time units in the first time resource pool.

In one embodiment, the first time unit is a last one of time units in the first time resource pool.

In one embodiment, the first time unit is any time unit comprised in the first time resource pool at an equal probability.

In one embodiment, the first time unit is a time unit randomly selected from the first time resource pool by the higher layer of the second node.

In one embodiment, the first time length is determined according to a position of the first time unit in the first time resource pool.

In one embodiment, the first MAC PDU is transmitted in the first time unit.

In one embodiment, a time interval from the first time unit to a time of generating the first MAC SDU is no greater than the second time length.

In one embodiment, a sum of the second time length and the first time length is no greater than the target time length.

In one embodiment, the first MAC PDU is received in the first time unit, from which the first time length is obtained.

In one embodiment, the first time length is transmitted from the higher layer of the first node to a lower layer of the first node.

In one embodiment, the first time length is transmitted from a MAC layer of the first node to a PHY layer of the first node.

In one embodiment, the second time resource pool comprises all sidelink slots that comprise available frequency-domain units within the first time length.

In one embodiment, the available frequency-domain unit comprises at least one RB.

In one embodiment, the available frequency-domain unit comprises at least one subchannel.

In one embodiment, the available frequency-domain unit comprises a positive integer number of subchannel(s), where the number of the subchannel(s) comprised is the same as that for transmitting the second MAC PDU.

In one embodiment, the available frequency-domain unit comprises a positive integer number of RB(s), where the number of the RB(s) comprised is the same as that for transmitting the second MAC PDU.

In one embodiment, the first node determines a fourth time resource pool according to the first time length, and performs channel sensing to determine the second time resource pool in the fourth time resource pool.

In one embodiment, the action of determining the second time resource pool is done in a PHY layer of the first node.

In one embodiment, the second time resource pool comprises all sidelink slots that comprise the available frequency-domain units in the fourth time resource pool.

In one embodiment, determining the second time resource pool in the fourth time resource pool comprises: determining a fourth time-frequency resource pool in the fourth time resource pool, the second time resource pool comprising all sidelink slots comprised in the fourth time-frequency resource pool.

In one embodiment, the action of determining the fourth time-frequency resource pool comprises: Step1) a third time-frequency resource pool comprises all frequency-domain units in the fourth time resource pool; Step2) the first node receives second SCI in the lower layer within the second time interval, the second SCI comprising any SCI received in a V2X resource pool, the second SCI indicating a priority and reserved time-frequency resources of a packet scheduled by the second SCI; an end of the second time interval is no later than a start of a slot n, where the slot n is a slot in which the higher layer of the first node requests the second time resource pool from the lower layer of the first node; Step3) the first node measures a second RSRP of a second PSSCH scheduled by the second SCI in a lower layer; Step4) if the second RSRP is greater than a second threshold, it is indicated by the second SCI that frequency-domain resources reserved that are comprised in the third time-frequency resource pool and the same as those occupied by the second PSSCH will be removed from the third time-frequency resource pool; Step5) if the number of the frequency-domain units left over in the third time-frequency resource pool is smaller than 0.2 multiples of the total number of the frequency-domain units in the fourth time resource pool, increment the second threshold by 3 dB and restart performing step2) Step6) S-RSSI is calculated for the frequency-domain units left over in the third time-frequency resource pool; Step7) the frequency-domain units left over in the third time-frequency resource pool are moved to the fourth time-frequency resource pool according to an ascending order of S-RSSI till a number of the frequency-domain units comprised in the fourth time-frequency resource pool is no smaller than 0.2 multiples of the total number of the frequency-domain units in the fourth time resource pool.

In one subembodiment, the second threshold is determined by a priority of the packet scheduled by the second SCI and a priority of the second MAC PDU.

In one subembodiment, any frequency-domain unit in the fourth time-frequency resource pool is the available frequency-domain unit.

In one embodiment, a priority of the second MAC PDU is the same as that of a MAC subPDU with the highest priority among the K2 MAC subPDUs comprised in the second MAC PDU.

In one embodiment, the fourth time-frequency resource pool comprises all the available frequency-domain units in the fourth time resource pool.

In one embodiment, a sidelink slot in which any available frequency-domain unit in the fourth time-frequency resource pool is comprised belongs to the fourth time resource pool.

In one embodiment, reporting the second time resource pool to the higher layer of the first node.

In one embodiment, reporting the available frequency-domain units comprised in the fourth time-frequency resource pool to the higher layer of the first node.

In one embodiment, reporting sidelink slots in the second time resource pool to the higher layer of the first node.

In one embodiment, reporting all the available frequency-domain units comprised in the sidelink slots in the second time resource pool to the higher layer of the first node.

In one embodiment, reporting the sidelink slots as well as all available frequency-domain units comprised in the sidelink slots in the second time resource pool to the higher layer of the first node.

In one embodiment, reporting a second index list to the higher layer of the first node, where any index in the second index list indicates a sidelink slot as well as a available frequency-domain unit in the sidelink slot comprised in the second time resource pool.

In one embodiment, the second time unit is selected from the second time resource pool by the higher layer of the first node.

In one embodiment, the second time unit is a first one of time units in the second time resource pool.

In one embodiment, the second time unit is a last one of time units in the second time resource pool.

In one embodiment, the second time unit is any time unit comprised in the second time resource pool at an equal probability.

In one embodiment, the second time unit is a time unit randomly selected from the second time resource pool by the higher layer of the first node.

In one embodiment, the first node transmits the second MAC PDU in the second time unit.

In one embodiment, a duration of the first time resource pool comprises a time interval between an earliest time unit comprised in the first time resource pool and a latest time unit comprised in the first time resource pool.

In one embodiment, a duration of the third time resource pool comprises a time interval between an earliest time unit comprised in the third time resource pool and a latest time unit comprised in the third time resource pool.

In one embodiment, a duration of the fourth time resource pool comprises a time interval between an earliest time unit comprised in the fourth time resource pool and a latest time unit comprised in the fourth time resource pool.

In one embodiment, a duration of the third time resource pool lasts no longer than the second time length.

In one embodiment, a duration of the first time resource pool is no greater than a duration of the third time resource pool.

In one embodiment, a duration of the fourth time resource pool lasts no longer than the first time length.

In one embodiment, a duration of the second time resource pool is no greater than the duration of the fourth time resource pool.

In one embodiment, the second time length is smaller than the target time length.

In one embodiment, the first time length is smaller than the target time length.

In one embodiment, a sum of the first time length and the second time length does not exceed the target time length.

In one embodiment, a sum of a duration of the first time resource pool and a duration of the second time resource pool does not exceed the target time length.

In one embodiment, the first channel and the second channel are respectively Data Radio Bearers (DRBs).

In one embodiment, the first channel and the second channel are respectively Signaling Radio Bearers (SRBs).

In one embodiment, the first channel and the second channel are respectively RLC Radio Bearers.

In one embodiment, the first channel is an RB established between the transmitter of the first MAC PDU and the first node.

In one embodiment, the first channel is a direct communication channel established between the transmitter of the first MAC PDU and the first node.

In one embodiment, the second channel is a Radio Bearer (RB) established between the first node and the target receiver of the second MAC PDU.

In one embodiment, the second channel is a direct communication channel established between the first node and the target receiver of the second MAC PDU.

In one embodiment, packets belonging to the first channel and the second channel respectively comprise a PDCP PDU.

In one embodiment, packets belonging to the first channel and the second channel respectively comprise an RLC SDU.

In one embodiment, packets belonging to the first channel and the second channel respectively comprise an RLC PDU.

In one embodiment, the transmitter of the first MAC PDU and the target receiver of the second MAC PDU are two communication nodes that are non-Co-located.

In one embodiment, a Source Layer 2 ID of the transmitter of the first MAC PDU is different from a source Layer 2 ID of the target receiver of the second MAC PDU.

In one embodiment, an IP address of the transmitter of the first MAC PDU is different from an IP address of the target receiver of the second MAC PDU.

Embodiment 7A

Figure 7A:
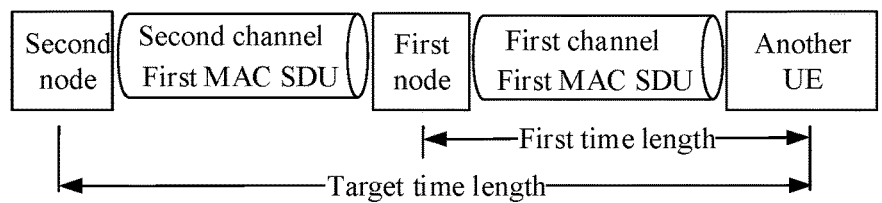
FIG. 7A illustrates a schematic diagram of a first channel, a second channel, a first node, a second node, another UE and a first MAC SDU, a first time length and a target time length according to one embodiment of the present application.

Embodiment 7A illustrates a schematic diagram of a first channel, a second channel, a first node, a second node, another UE and a first MAC SDU, a first time length and a target time length according to one embodiment of the present application, as shown in FIG. 7A.

In one embodiment, the first channel and the second channel are respectively Data Radio Bearers (DRBs).

In one embodiment, the first channel and the second channel are respectively Signaling Radio Bearers (SRBs).

In one embodiment, the first channel and the second channel are respectively RLC Radio Bearers.

In one embodiment, the first channel is used by the first node for transmitting to the other UE a QoS flow to which the first MAC SDU belongs.

In one embodiment, the first channel is used by the first node for transmitting to the other UE a PC5 QoS flow to which the first MAC SDU belongs.

In one embodiment, the second channel is used by the second node for transmitting to the first node a QoS flow to which the first MAC SDU belongs.

In one embodiment, the second channel is used by the second node for transmitting to the first node a PC5 QoS flow to which the first MAC SDU belongs.

In one embodiment, the first time length is applied in the first channel.

In one embodiment, a third time length is a difference of the target time length and the first time length.

In one embodiment, the third time length is applied in the second channel.

In one embodiment, the third time length is used by the second node for choosing to transmit time-frequency resources of the first MAC PDU.

In one embodiment, a time interval between a time at which the first node receives the first MAC PDU and a time at which the second node generates the first MAC SDU is no greater than the third time length.

In one embodiment, in a MAC layer of the second node the first MAC SDU is generated, and the first MAC PDU is generated and transmitted; a time interval between a time at which the second node transmits the first MAC PDU and a time at which the first MAC SDU is generated by a MAC layer of the second node is no greater than the third time length.

In one embodiment, a delay for the first MAC SDU being transmitted through the second channel is no greater than the third time length.

In one embodiment, a delay for the first MAC SDU being transmitted through the first channel is no greater than the first time length.

In one embodiment, the second node transmits second UE information, the second UE information indicating the third time length, a target receiver of the second UE information being a serving base station for the second node.

In one embodiment, the second UE information comprises a Packet Delay Budget (PDB) IE in an RRC signaling.

In one embodiment, the second UE information comprises a PDB parameter in an IE field in an RRC signaling.

In one embodiment, the second UE information is transmitted in an uplink.

In one embodiment, the second UE information is transmitted via a Uu interface.

In one embodiment, the first node transmits first UE information, the first UE information indicating the first time length, a target receiver of the first UE information being a serving base station for the first node.

In one embodiment, the first UE information comprises an NR-PDB IE in an RRC signaling.

In one embodiment, the first UE information comprises an NR-PDB parameter in an IE field in an RRC signaling.

In one embodiment, the first UE information is transmitted in an uplink.

In one embodiment, the first UE information is transmitted via a Uu interface.

Embodiment 7B

Figure 7B:
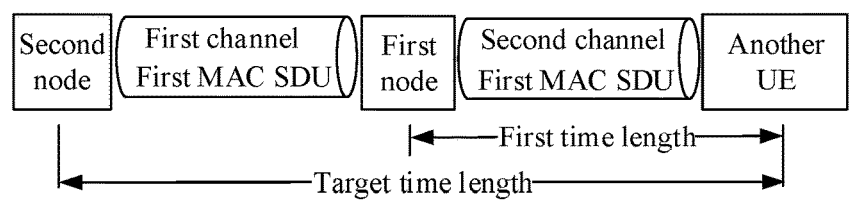
FIG. 7B illustrates a schematic diagram of a first channel, a second channel, a first node, a second node, another UE and a first MAC SDU, a first time length and a target time length according to one embodiment of the present application.

Embodiment 7B illustrates a schematic diagram of a first channel, a second channel, a first node, a second node, another UE and a first MAC SDU, a first time length and a target time length according to one embodiment of the present application, as shown in FIG. 7B.

In one embodiment, the first channel is used by the second node for transmitting to the first node a QoS flow to which the first MAC SDU belongs.

In one embodiment, the first channel is used by the second node for transmitting to the first node a PC5 QoS flow to which the first MAC SDU belongs.

In one embodiment, the second channel is used by the first node for transmitting to the other UE a QoS flow to which the first MAC SDU belongs.

In one embodiment, the second channel is used by the first node for transmitting to the other UE a PC5 QoS flow to which the first MAC SDU belongs.

In one embodiment, the first time length is applied in the second channel.

In one embodiment, the first time length is no greater than a difference between the target time length and the second time length.

In one embodiment, the second time length is applied in the first channel.

In one embodiment, the second time length is used by the second node for choosing to transmit time-frequency resources of the first MAC PDU.

In one embodiment, a time interval between a time at which the first node receives the first MAC PDU and a time at which the second node generates the first MAC SDU is no greater than the second time length.

In one embodiment, in a MAC layer of the second node the first MAC SDU is generated, and the first MAC PDU is generated; the second node transmits the first MAC PDU in the first time unit; a time interval between the first time unit and a time at which the first MAC SDU is generated by a MAC layer of the second node is no greater than the second time length.

In one embodiment, a delay for the first MAC SDU being transmitted through the first channel is no greater than the second time length.

In one embodiment, a delay for the first MAC SDU being transmitted through the second channel is no greater than the first time length.

In one embodiment, a sum of delays for the first MAC SDU being respectively transmitted through the first channel and the second channel is no greater than the target time length.

Embodiment 8A

Figure 8A:
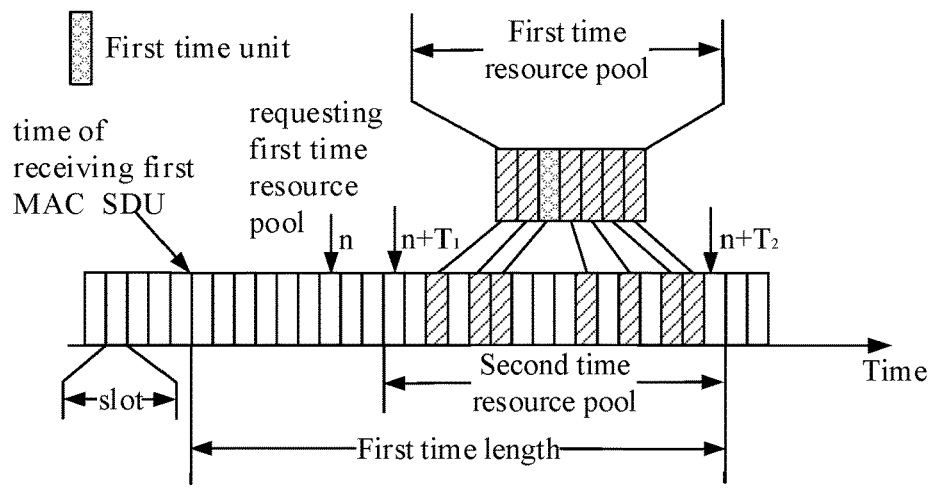
FIG. 8A illustrates a schematic diagram of a time of receiving a first MAC SDU, a second time resource pool, a first time resource pool and a first time unit according to one embodiment of the present application.

Embodiment 8A illustrates a schematic diagram of a time of receiving a first MAC SDU, a second time resource pool, a first time resource pool and a first time unit according to one embodiment of the present application, as shown in FIG. 8A. In FIG. 8A, the rectangle filled with oblique lines represents sidelink slots comprised in the first time resource pool, and the rectangle filled with grids represents a first time unit, the first time unit only comprising one sidelink slot.

In one embodiment, the first MAC SDU is received in the MAC layer of the first node.

In one embodiment, the first MAC PDU is received in the MAC layer of the first node, from which the first MAC SDU is disassembled and transmitted to the RLC layer of the first node.

In one embodiment, the first time length is used to determine the second time resource pool.

In one embodiment, a time interval between a time of receiving the first MAC SDU and an end time of a last slot in the second time resource pool is equal to the first time length.

In one embodiment, a time interval between a time of receiving the first MAC SDU and an end time of a last slot in the second time resource pool is smaller than the first time length.

In one embodiment, any slot in the second time resource pool is reserved for the sidelink.

In one embodiment, partial slots in the second time resource pool are reserved for the sidelink.

In one embodiment, the second time resource pool belongs to a V2X resource pool.

In one embodiment, any sidelink slot in the first time resource pool belongs to the second time resource pool.

In one embodiment, a length of the first time resource pool is no greater than that of the second time resource pool.

In one embodiment, a length of the first time resource pool is equal to that of the second time resource pool.

In one embodiment, the first time resource pool comprises sidelink slots in the second time resource pool.

In one embodiment, a start time of the first time resource pool is no earlier than a start time of the second time resource pool.

In one embodiment, an end time of the first time resource pool is no later than an end time of the second time resource pool.

In one embodiment, the lower layer of the first node receives a first request from the higher layer of the first node in the slot n, the first request being used for requesting determination of the first time resource pool in the lower layer of the first node.

In one embodiment, an end time of the second time resource pool is an end time of a slot indicated by a sum of then and T2.

In one embodiment, T2 is measured in slots.

In one embodiment, T2 is measured in sidelink slots.

In one embodiment, a time length indicated by the T2's value is the first time length.

In one embodiment, a time length indicated by the T2's value is smaller than the first time length.

In one embodiment, a difference between the first time length and the time length indicated by the T2's value contains waiting time for transmission of at least partial bits in the first MAC SDU comprised in the second MAC PDU by the first node.

In one embodiment, the waiting time for transmission comprises a Queueing Time on the higher layer and above layers.

In one embodiment, a difference between the first time length and the time length indicated by the T2's value contains a time interval between a time of receiving the first MAC SDU and an end time of the slot n.

In one embodiment, the T2's value is determined by UE implementation.

In one embodiment, a start time of the second time resource pool is a start time of a slot indicated by a sum of then and T1.

In one embodiment, T1 is measured in slots.

In one embodiment, T1 is measured in sidelink slots.

In one embodiment, the T1's value meets 1≤T≤4.

In one embodiment, the T1's value is determined by UE implementation.

In one embodiment, a time length indicated by the T1's value comprises a processing delay of the first node for the second MAC PDU in a higher layer and a lower layer.

In one embodiment, the time length indicated by the T1's value comprises a processing delay of the second MAC PDU in a lower layer.

In one embodiment, the second time resource pool comprises all sidelink slots from n+T1 to n+T2 inclusive, i.e., [n+T1, n+T2].

As shown in FIG. 8A, T1 is 3, and T2 is 18, the second time resource pool comprising 16 sidelink slots from n+3 to n+18.

In one embodiment, the time length indicated by the T1's value is determined by a subcarrier spacing of the available frequency-domain units comprised in the first time resource pool.

In one embodiment, the time length indicated by the T1's value is a product of the T1's value and a duration of a sidelink slot comprised in the first time resource pool.

In one embodiment, the time length indicated by the T2's value is determined by a subcarrier spacing of the available frequency-domain units comprised in the second time resource pool.

In one embodiment, the time length indicated by the T2's value is a product of the T2's value and a duration of a sidelink slot comprised in the first time resource pool.

In one embodiment, the first time resource pool is a subset of the second time resource pool.

In one embodiment, the first time resource pool comprises all the sidelink slots that comprise the available frequency-domain units in the second time resource pool.

In one embodiment, any two adjacent sidelink slots among the sidelink slots comprised in the first time resource pool are spaced by a natural number of sidelink slot(s).

Embodiment 8B

Figure 8B:
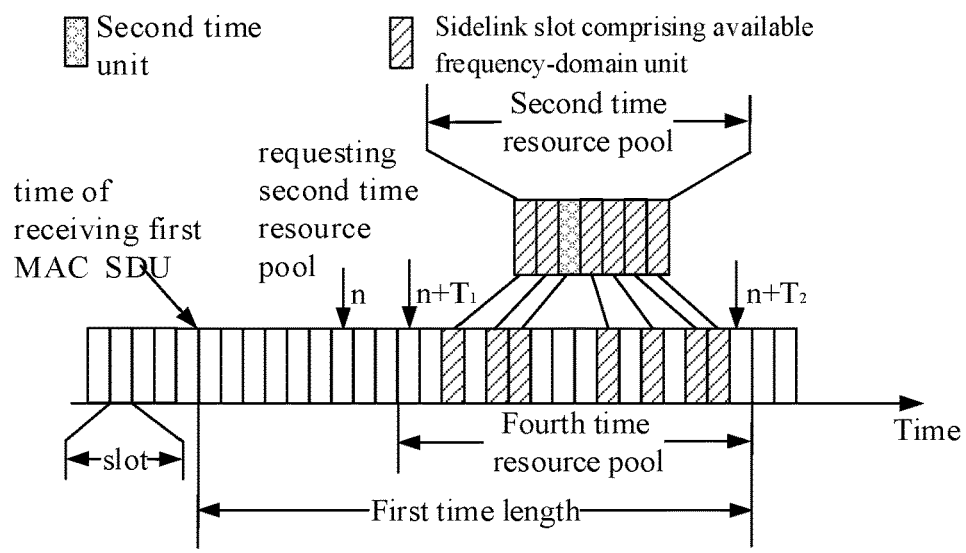
FIG. 8B illustrates a schematic diagram of a time of receiving a first MAC SDU, a second time resource pool, a fourth time resource pool and a second time unit according to one embodiment of the present application.

Embodiment 8B illustrates a schematic diagram of a time of receiving a first MAC SDU, a second time resource pool, a fourth time resource pool and a second time unit according to one embodiment of the present application, as shown in FIG. 8B. In FIG. 8B, the rectangle filled with oblique lines represents all sidelink slots that comprise available frequency-domain units in the fourth time resource pool, and the rectangle filled with grids represents a second time unit, the second time unit only comprising one sidelink slot.

In one embodiment, the first MAC SDU is received in the MAC layer of the first node.

In one embodiment, the first MAC PDU is received in the MAC layer of the first node, from which the first MAC SDU is disassembled.

In one embodiment, the first time length indicates a longest delay between the first node's receiving the first MAC SDU and transmitting the first MAC SDU.

In one embodiment, the first node's transmitting the first MAC SDU includes transmitting the second MAC PDU, the second MAC PDU comprising the first MAC SDU.

In one embodiment, the first node's transmitting the first MAC SDU includes transmitting multiple MAC PDUs, any of the multiple MAC PDUs comprising partial bits in the first MAC SDU.

In one embodiment, the first time length is used to determine the fourth time resource pool.

In one embodiment, a time interval between a time of receiving the first MAC SDU and an end time of a last slot in the fourth time resource pool is equal to the first time length.

In one embodiment, a time interval between a time of receiving the first MAC SDU and an end time of a last slot in the fourth time resource pool is smaller than the first time length.

In one embodiment, any slot in the fourth time resource pool is reserved for the sidelink.

In one embodiment, partial slots in the fourth time resource pool are reserved for the sidelink.

In one embodiment, the fourth time resource pool belongs to a V2X resource pool.

In one embodiment, any slot in the second time resource pool belongs to the fourth time resource pool.

In one embodiment, any slot in the second time resource pool is reserved for the sidelink.

In one embodiment, a duration of the second time resource pool is no greater than a duration of the fourth time resource pool.

In one embodiment, a duration of the second time resource pool is equal to a duration of the fourth time resource pool.

In one embodiment, a start time of the second time resource pool is no earlier than a start time of the fourth time resource pool.

In one embodiment, an end time of the second time resource pool is no later than an end time of the fourth time resource pool.

In one embodiment, a start time of the second time resource pool is a start time of an earliest slot comprised in the second time resource pool.

In one embodiment, a start time of the fourth time resource pool is a start time of an earliest slot comprised in the fourth time resource pool.

In one embodiment, an end time of the second time resource pool is an end time of a last slot comprised in the second time resource pool.

In one embodiment, an end time of the fourth time resource pool is an end time of a last slot comprised in the fourth time resource pool.

In one embodiment, the lower layer of the first node receives a first request from the higher layer of the first node in the slot n, the first request being used for requesting the second time resource pool.

In one embodiment, an end time of the fourth time resource pool is an end time of a slot indicated by a sum of then and T2.

In one embodiment, T2 is measured in slots.

In one embodiment, T2 is measured in sidelink slots.

In one embodiment, a time length indicated by the T2's value is the first time length.

In one embodiment, a time length indicated by the T2's value is smaller than the first time length.

In one embodiment, a difference between the first time length and the time length indicated by the T2's value contains waiting time for transmission of at least partial bits in the first MAC SDU by the first node.

In one embodiment, the waiting time for transmission comprises a Queueing Time on the higher layer and above layers of the first node.

In one embodiment, a difference between the first time length and the time length indicated by the T2's value contains a time interval between a time of receiving the first MAC SDU and an end time of the slot n.

In one embodiment, the T2's value is determined by UE implementation.

In one embodiment, a start time of the fourth time resource pool is a start time of a slot indicated by a sum of the n and T1.

In one embodiment, T1 is measured in slots.

In one embodiment, T1 is measured in sidelink slots.

In one embodiment, the T1's value meets 1≤T≤4.

In one embodiment, the T1's value is determined by UE implementation.

In one embodiment, a time length indicated by the T1's value comprises a processing delay of the first node for the second MAC PDU in the higher layer and the lower layer.

In one embodiment, the time length indicated by the T1's value comprises a processing delay of the second MAC PDU in the lower layer.

In one embodiment, the fourth time resource pool comprises all slots from n+T1 to n+T2 inclusive, i.e., [n+T1, n+T2].

As shown in FIG. 8B, T1 is 3, and T2 is 18, the fourth time resource pool comprising 16 slots from n+3 to n+18.

In one embodiment, the time length indicated by the T1's value is determined by a subcarrier spacing of the available frequency-domain units comprised in the fourth time resource pool.

In one embodiment, the time length indicated by the T1's value comprises a product of the T1's value and a duration of a slot comprised in the fourth time resource pool.

In one embodiment, the time length indicated by the T2's value is determined by a subcarrier spacing of the available frequency-domain units comprised in the fourth time resource pool.

In one embodiment, the time length indicated by the T2's value comprises a product of the T2's value and a duration of a slot comprised in the fourth time resource pool.

In one embodiment, the second time resource pool is a subset of the fourth time resource pool.

In one embodiment, any two adjacent slots among the slots comprised in the second time resource pool are spaced by a natural number of slot(s).

In one embodiment, a process in which the second node determines the third time resource pool according to the second time length is the same as that the first node determines the second time resource pool, hence no need to give unnecessary details.

Embodiment 9

Figure 9:
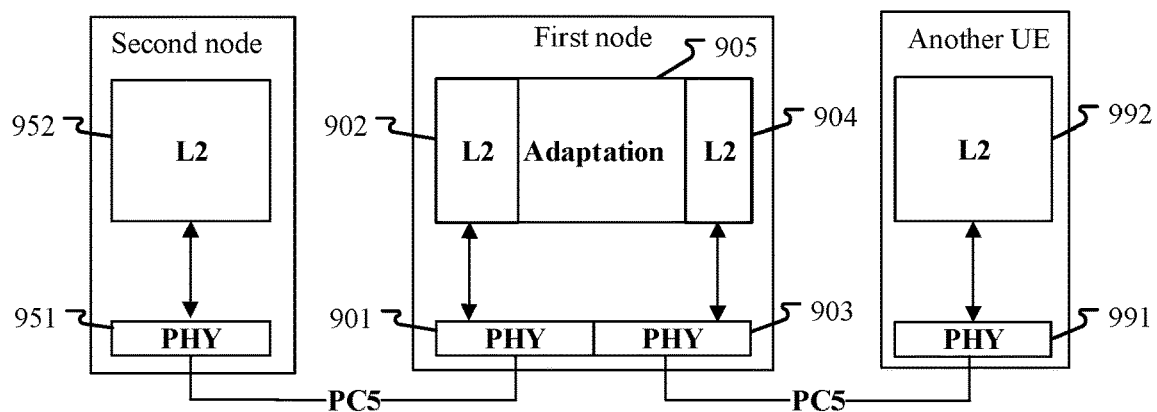
FIG. 9 illustrates a schematic diagram of a radio protocol architecture of user planes of a first node, a second node and another UE according to one embodiment of the present application.

Embodiment 9 illustrates a schematic diagram of a radio protocol architecture of user planes of a first node, a second node and another UE according to one embodiment of the present application, as shown in FIG. 9.

In one embodiment, PHY layers 901 and 903 comprised in the first node, a PHY layer 951 comprised in the second node and a PHY layer 991 comprised in the other UE include a PHY 351 comprised in the user plane 350 in FIG. 3 of the present application.

In one embodiment, L2 layers 902 and 904 comprised in the first node respectively comprise partial or all of protocol sublayers among the MAC sublayer 352, the RLC sublayer 353, the PDCP sublayer 354 and the SDAP sublayer 356 comprised in the L2 355 comprised in the user plane 350 in FIG. 3 of the present application.

In one embodiment, L2 layer 952 comprised in the second node and L2 992 comprised in the other UE respectively comprise the MAC sublayer 352, the RLC sublayer 353, the PDCP sublayer 354 and the SDAP sublayer 356 in the L2 355 comprised in the user plane 350 in FIG. 3 of the present application.

In one embodiment, the L2 layer 902 comprised in the first node comprises the MAC sublayer 352 in the L2 355 comprised in the user plane in FIG. 3 of the present application.

In one embodiment, the L2 layer 902 comprised in the first node comprises the MAC sublayer 352 and the RLC sublayer 353 in the L2 355 comprised in the user plane in FIG. 3 of the present application.

In one embodiment, the L2 layer 902 comprised in the first node comprises the MAC sublayer 352, the RLC sublayer 353 and the PDCP sublayer 354 in the L2 355 comprised in the user plane in FIG. 3 of the present application.

In one embodiment, the L2 layer 902 comprised in the first node comprises the MAC sublayer 352, the RLC sublayer 353 and the PDCP sublayer 354 and the SDAP sublayer 356 in the L2 355 comprised in the user plane in FIG. 3 of the present application.

In one embodiment, the L2 layer 904 comprised in the first node comprises the MAC sublayer 352 in the L2 355 comprised in the user plane in FIG. 3 of the present application.

In one embodiment, the L2 layer 904 comprised in the first node comprises the MAC sublayer 352 and the RLC sublayer 353 in the L2 355 comprised in the user plane in FIG. 3 of the present application.

In one embodiment, the L2 layer 904 comprised in the first node comprises the MAC sublayer 352, the RLC sublayer 353 and the PDCP sublayer 354 in the L2 355 comprised in the user plane in FIG. 3 of the present application.

In one embodiment, the L2 layer 904 comprised in the first node comprises the MAC sublayer 352, the RLC sublayer 353 and the PDCP sublayer 354 and the SDAP sublayer 356 in the L2 355 comprised in the user plane in FIG. 3 of the present application.

In one embodiment, the first node comprises an adaptation sublayer 905.

In one embodiment, the adaptation sublayer 905 is below or above any protocol sublayer comprised in the L2 layer 902 comprised in the first node.

In one embodiment, the adaptation sublayer 905 is above the RLC sublayer 353 comprised in the L2 layer 902 comprised in the first node.

In one embodiment, the adaptation sublayer 905 is below or above any protocol sublayer comprised in the L2 layer 904 comprised in the first node.

In one embodiment, the adaptation sublayer 905 is above the RLC sublayer 353 comprised in the L2 layer 904 comprised in the first node.

In one embodiment, the first node and the second node are connected via a PC5 interface, where the PHY layer 901 comprised in the first node and the PHY layer 951 comprised in the second node correspond to each other.

In one embodiment, the first node and the other UE are connected via a PC5 interface, where the PHY layer 903 comprised in the first node and the PHY layer 991 comprised in the other UE correspond to each other.

In one embodiment, the first MAC SDU is received by the L2 layer 902 comprised in the first node.

In one embodiment, the first MAC PDU is received by the L2 layer 902 comprised in the first node.

In one embodiment, the second MAC SDU is received by the L2 layer 904 comprised in the first node.

In one embodiment, the second MAC PDU is received by the L2 layer 904 comprised in the first node.

In one embodiment, the first MAC SDU is received by the L2 layer 952 comprised in the second node.

In one embodiment, the first MAC PDU is received by the L2 layer 952 comprised in the second node.

Embodiment 10A

Figure 10A:
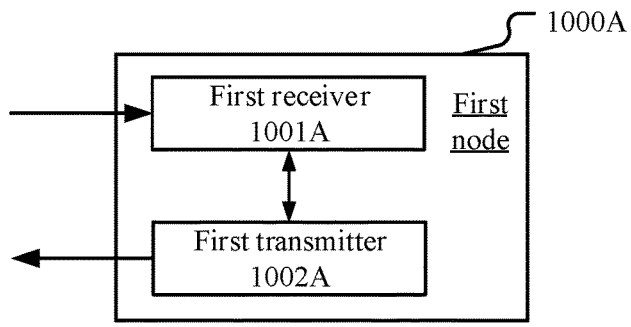
FIG. 10A illustrates a structure block diagram of a processing device in a first node according to one embodiment of the present application.

Embodiment 10A illustrates a structure block diagram of a processing device in a first node according to one embodiment of the present application, as shown in FIG. 10A. In FIG. 10A, a processing device 1000A in the first node is comprised of a first receiver 1001A and a first transmitter 1002A. The first receiver 1001A comprises at least one of the transmitter/receiver 456A (comprising the antenna 460A), the receiving processor 452A or the controller/processor 490A in FIG. 4 of the present application; the first transmitter 1002A comprises at least one of the transmitter/receiver 456A (comprising the antenna 460A), the transmitting processor 455A or the controller/processor 490A in FIG. 4 of the present application.

In Embodiment 10A, the first transmitter 1002A transmits first assistance information, the first assistance information indicating a transmission state of a first channel; and the first receiver 1001A receives first configuration information, the first configuration information indicating a first time length; the first receiver 1001A receives a first MAC PDU, the first MAC PDU comprising a first MAC subPDU, the first MAC subPDU comprising a first MAC SDU; selects a first time unit from a first time resource pool; and the first transmitter 1002A transmits a second MAC PDU in the first time unit; herein, the first assistance information is used for generating the first configuration information, and the second MAC PDU comprises at least partial bits in the first MAC SDU; the first channel connects the first node to a target receiver receiving the second MAC PDU; a second channel connects a transmitter transmitting the first MAC PDU to the first node; the transmitter transmitting the first MAC PDU and the target receiver receiving the second MAC PDU are Non-Co-located; the first time length is used to determine the first time resource pool.

In one embodiment, the first receiver 1001A determines the first time resource pool in a lower layer according to the first time length; where a time length of the first time resource pool is no greater than the first time length; the first receiver 1001A reports the first time resource pool to a higher layer of the first node.

In one embodiment, a time interval from a last time unit in the first time resource pool to a time of receiving the first MAC SDU does not exceed the first time length.

In one embodiment, a target time length is determined, and a first threshold is received; where a difference between the transmission state of the first channel and a transmission state of the second channel is no smaller than the first threshold; the first time length is no greater than the target time length.

In one embodiment, a target time length is determined, and a first threshold is received; where a difference between the transmission state of the first channel and a transmission state of the second channel is no smaller than the first threshold; the first time length is no greater than the target time length; a delay after the first MAC SDU being transmitted through the second channel and the first channel being no greater than the target time length.

In one embodiment, the first time unit is any time unit in the first time resource pool; herein, the first time resource pool comprises at least one time unit.

Embodiment 10B

Figure 10B:
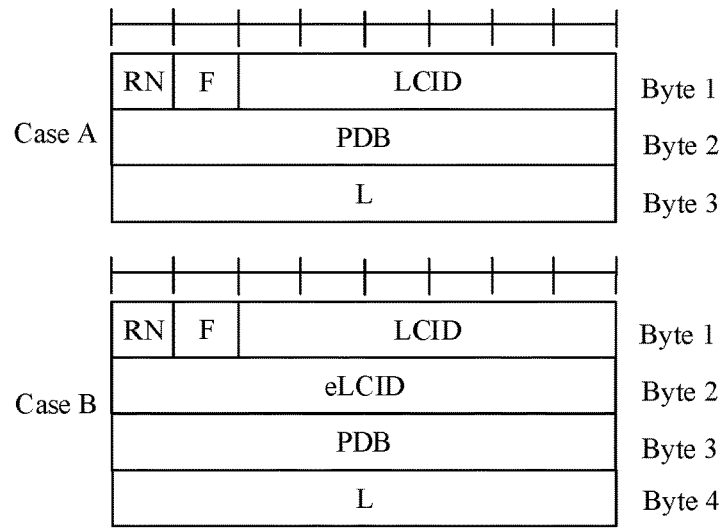
FIG. 10B illustrates a schematic diagram of a MAC subheader format according to one embodiment of the present application.

Embodiment 10B illustrates a schematic diagram of a MAC subheader format according to one embodiment of the present application, as shown in FIG. 10B.

In one embodiment, a MAC subheader indicates a MAC SDU, and the MAC subheader and the MAC SDU constitute a MAC subPDU.

In one embodiment, the MAC subheader comprises at least one of a Relay Node (RN) field, an F field, a LCID field, an extended LCID (eLCID) field, a Packet Delay Budget (PDB) field or an L field.

In one embodiment, the RN field indicates whether the MAC subheader comprises the PDB field, the RN field occupying 1 bit; the RN's value being 0 indicates that the MAC subheader does not comprise the PDB field, while the RN's value being 1 indicates that the MAC subheader comprises the PDB field.

In one embodiment, when the RN field indicates that the MAC subheader comprises the PDB field, the PDB field indicates the first time length.

In one embodiment, the F field indicates a number of bit(s) comprised in the L field, the F field occupying 1 bit; the F field's value being 0 indicates that the L field comprises 8 bits; the F field's value being 1 indicates that the L field comprises 16 bits.

In one embodiment, the LCID field indicates a logical channel instance of the MAC SDU or a type of the MAC CE or 33 or 34; the 33 indicates that an eLCID field that follows closely comprises 2 bytes, and the 34 indicates that an eLCID field that follows closely comprises 1 byte.

In one embodiment, the eLCID is an extended logical channel identity, and the eLCID field indicates a logical channel instance of the MAC SDU, the eLCID field comprising 8 bits or 16 bits.

In one embodiment, the PDB field comprises 5 bits.
In one embodiment, the PDB field comprises 6 bits.
In one embodiment, the PDB field comprises 7 bits.
In one embodiment, the PDB field comprises 8 bits.
In one embodiment, the L indicates a length of the MAC SDU.

In Case A of Embodiment 10B, the RN field comprised in the MAC subheader is XX, which indicates that the MAC subheader comprises the PDB field, the PDB field comprising 8 bits; and the F field is 0, which indicates that the L field comprises 8 bits.

In Case B of Embodiment 10B, the RN field comprised in the MAC subheader is 1, which indicates that the MAC subheader comprises the PDB field, the PDB field comprising 8 bits; and the F field is 0, which indicates that the L field comprises 8 bits; and the LCID is 33, which indicates that the eLCID field comprises 8 bits.

In one embodiment, an RN field in the first MAC subheader is 1, which indicates that the first MAC subheader comprises the PDB field, the PDB field indicating the first time length.

Embodiment 11A

Figure 11A:
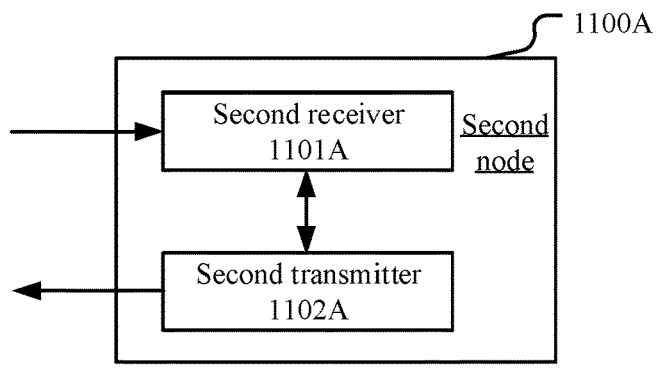
FIG. 11A illustrates a structure block diagram of a processing device in a second node according to one embodiment of the present application.

Embodiment 11A illustrates a structure block diagram of a processing device in a second node according to one embodiment of the present application, as shown in FIG. 11A. In FIG. 11A, a processing device 1100A in the second node is comprised of a second receiver 1101A and a second transmitter 1102A. The second receiver 1101A comprises at least one of the transmitter/receiver 416A (comprising the antenna 420A), the receiving processor 412A or the controller/processor 440A in FIG. 4A of the present application; The second transmitter 1102A comprises at least one of the transmitter/receiver 416A (comprising the antenna 420A), the transmitting processor 415A or the controller/processor 440A in FIG. 4A of the present application.

In Embodiment 11A, the second receiver 1101A receives first assistance information, the first assistance information being used for indicating a transmission state of a first channel; and the second transmitter 1102A transmits first configuration information, the first configuration information indicating a first time length; the second transmitter 1102A transmits a first MAC PDU, the first MAC PDU comprising a first MAC subPDU, the first MAC subPDU comprising a first MAC SDU; herein, a first time unit is selected from a first time resource pool; a second MAC PDU is transmitted in the first time unit; the first assistance information is used for generating the first configuration information, the second MAC PDU comprising at least partial bits in the first MAC SDU; the first channel connects the first node to a target receiver receiving the second MAC PDU; a second channel connects a transmitter transmitting the first MAC PDU to the first node; the transmitter transmitting the first MAC PDU and the target receiver receiving the second MAC PDU are Non-Co-located; the first time length is used to determine the first time resource pool.

In one embodiment, the first time resource pool is determined in a lower layer according to the first time length; where a time length of the first time resource pool is no greater than the first time length; and the first time resource pool is reported to a higher layer of the first node.

In one embodiment, a time interval from a last time unit in the first time resource pool to a time of receiving the first MAC SDU does not exceed the first time length.

In one embodiment, the second receiver 1101A determines a target time length and receives a first threshold; where a difference between the transmission state of the first channel and a transmission state of the second channel is no smaller than the first threshold; the first time length is no greater than the target time length.

In one embodiment, the second receiver 1101A determines a target time length and receives a first threshold; where a difference between the transmission state of the first channel and a transmission state of the second channel is no smaller than the first threshold; the first time length is no greater than the target time length; a delay after the first MAC SDU being transmitted through the second channel and the first channel being no greater than the target time length.

In one embodiment, the first time unit is any time unit in the first time resource pool; herein, the first time resource pool comprises at least one time unit.

Embodiment 11B

Figure 11B:
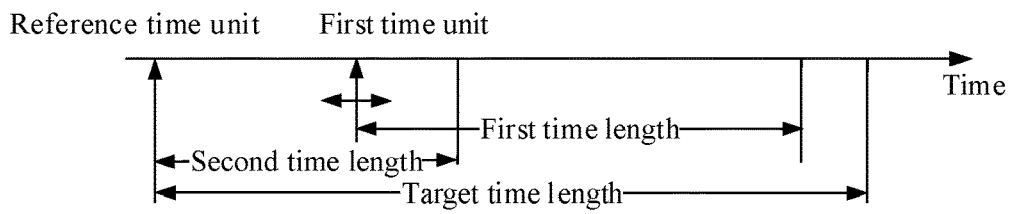
FIG. 11B illustrates a schematic diagram of relations among a first time length, a first time unit and a target time length according to one embodiment of the present application.

Embodiment 11B illustrates a schematic diagram of relations among a first time length, a first time unit and a target time length according to one embodiment of the present application, as shown in FIG. 11B.

In one embodiment, the later the first time unit is relative to a reference time unit, the smaller the first time length.

In one embodiment, the reference time unit is a time unit in which a time of the first MAC SDU being generated is comprised.

In one embodiment, a time interval from a time unit obtained after delaying the first time unit by the first time length to the reference time unit does not exceed the target time length.

In one embodiment, a time interval from a time unit obtained after delaying the first time unit by the first time length to the reference time unit is equal to the target time length.

In one embodiment, a position of the first time unit is no later than a time unit obtained after delaying the reference time unit by the second time length; the position of the first time unit is used to determine the first time length.

In one embodiment, a first delay comprises a time interval between the first time unit and the reference time unit.

In one embodiment, a first remaining time length is a difference between the target time length and the first delay, where the first time length is determined based on the first remaining time length.

In one embodiment, a value of the first time length is the same as a value of the first remaining time length.

In one embodiment, a value of the first time length is determined by UE implementation, and the value of the first time length is no greater than the first remaining time length.

In one embodiment, a value of the first remaining time length is Z, where X and Y are values of two adjacent time lengths in the first time length set.

In one embodiment, when values of the X, Y and Z meets X<Z<Y, the first time length has the value of X.

In one embodiment, the first delay is measured in slots.

In one embodiment, the first delay is measured in subframes.

In one embodiment, the first delay is measured in milliseconds (ms).

In one embodiment, the first time length belongs to the first time length set, the first time length set comprising M time length(s), M being a positive integer; herein, any time length in the first time length set can be indicated by a time length index with Q bits, where $Q = \lceil \log_2 M \rceil$, $\lceil \cdot \rceil$ referring to the operation of ceiling.

In one embodiment, the M time lengths comprised in the first time length set respectively correspond to M said time length indexes.

In one embodiment, the M time lengths comprised in the first time length set are pre-configured.

In one embodiment, the first node receives first configuration information, the first configuration information indicating the target time length.

In one embodiment, a transmitter of the first configuration information is the second node in the present application.

In one embodiment, the first configuration information is transmitted via a PC5 interface.

In one embodiment, the first configuration information is transmitted in a sidelink.

In one embodiment, the first configuration information comprises all or part of a higher layer signaling.

In one embodiment, the first configuration information comprises all or part of a physical layer signaling.

In one embodiment, the first configuration information is RRC layer information.

In one embodiment, the first configuration information is V2X layer information.

In one embodiment, the first configuration information is PC5-signaling (PC5-S) information.

In one embodiment, the first configuration information comprises all or part of Information Elements (IEs) in a PC5-S signaling.

In one embodiment, the first configuration information comprises all or part of Information Elements (IEs) in an RRC signaling.

In one embodiment, the first configuration information comprises all or partial fields in an IE in an RRC signaling.

In one embodiment, the first configuration information comprises an RRCReconfigurationSidelink signaling.

In one embodiment, the first configuration information comprises all or partial IEs in an RRCReconfigurationSidelink signaling.

In one embodiment, the first configuration information comprises all or partial fields in an IE in an RRCReconfigurationSidelink signaling.

In one embodiment, as a response to the first configuration information, the first node transmits an RRCReconfigurationCompleteSidelink message.

In one embodiment, the first configuration information is transmitted through a SL-SCH.

In one embodiment, the first configuration information is transmitted through a PSSCH.

In one embodiment, the first configuration information is unicast.

In one embodiment, the first configuration information is groupcast.

In one embodiment, an m-th time length among the M time lengths comprised in the first time length set has a value of $$m \times \left\lfloor \frac{P}{M} \right\rfloor,$$

where $\lfloor \cdot \rfloor$ refers to the operation of flooring, P is the value of the target time length, and $1 \leq m \leq M$, m being a positive integer.

In one embodiment, an m-th time length among the M time lengths comprised in the first time length set has a value of $$m \times \frac{P}{M},$$

where $1 \leq m \leq M$, m being a positive integer.

In one embodiment, a first time length among the M time lengths comprised in the first time length set has a value of a first threshold D1.

In one embodiment, a last time length among the M time lengths comprised in the first time length set has a value of a second threshold DM, the second threshold being the target time length minus the first threshold, i.e., DM=P−D1.

In one embodiment, an m-th time length among the M time lengths comprised in the first time length set, other than the last time length and the last time length, has a value of $$D_1 + (m-1) \times \frac{P - 2 \times D_1}{M-1},$$

where 1<m<M.

In one embodiment, the first threshold is greater than 0.
In one embodiment, the first threshold is pre-specified.
In one embodiment, the first threshold is pre-configured.
In one embodiment, the first threshold is dependent upon processing capabilities of the first node and the second node.
In one embodiment, the first threshold is dependent upon categories of the first node and the second node.

Embodiment 12

Figure 12:
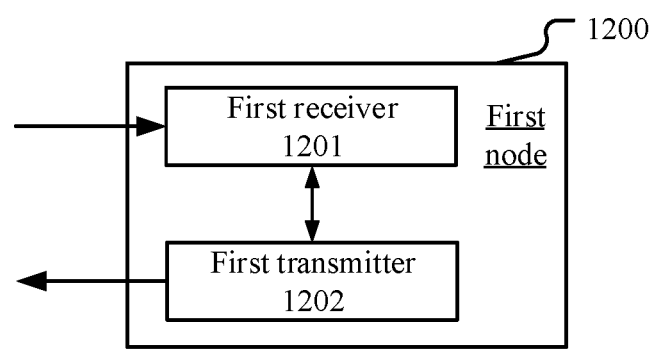
FIG. 12 illustrates a structure block diagram of a processing device in a first node according to one embodiment of the present application.

Embodiment 12 illustrates a structure block diagram of a processing device in a first node according to one embodiment of the present application, as shown in FIG. 12. In FIG. 12, a processing device 1200 in a first node is comprised of a first receiver 1201 and a first transmitter 1202. The first receiver 1201 comprises at least one of the transmitter/receiver 454B (comprising the antenna 452B), the receiving processor 456B, the multi-antenna receiving processor 458B or the controller/processor 459B in FIG. 4B of the present application; the first transmitter 1202 comprises at least one of the transmitter/receiver 454B (comprising the antenna 452B), the transmitting processor 468B, the multi-antenna transmitting processor 457B or the controller/processor 459B in FIG. 4B of the present application.

In Embodiment 12, the first receiver 1201 receives a first MAC PDU in a first time unit; the first transmitter 1202 selects a second time unit from a second time resource pool; and the first transmitter 1202 transmits a second MAC PDU in the second time unit; herein, the first MAC PDU comprises a first MAC subPDU, the first MAC subPDU comprising a first MAC subheader and a first MAC SDU; the first MAC subheader indicates a first time length; the first time length is used to determine the second time resource pool; the second MAC PDU comprises at least partial bits in the first MAC SDU; the first time length is dependent on a position of the first time unit.

In one embodiment, the first time unit is selected from a first time resource pool; a sum of a duration of the first time resource pool and a duration of the second time resource pool does not exceed a target time length, the target time length being determined by a transmitter transmitting the first MAC SDU.

In one embodiment, the first time unit is selected from a first time resource pool; a sum of a duration of the first time resource pool and a duration of the second time resource pool does not exceed a target time length, the target time length being determined by a transmitter transmitting the first MAC SDU; a sum of the first time length and a time interval from the first time unit to a time of generating the first MAC SDU is no greater than the target time length.

In one embodiment, the first receiver 1201 determines the second time resource pool in a lower layer according to the first time length; the first receiver 1201 reports the second time resource pool to a higher layer of the first node.

In one embodiment, a time interval from a last time unit in the second time resource pool to a time of receiving the first MAC SDU does not exceed the first time length.

In one embodiment, a first channel connects a transmitter transmitting the first MAC PDU to the first node; the second channel connects the first node to a target receiver receiving the second MAC PDU; the transmitter transmitting the first MAC PDU and the target receiver receiving the second MAC PDU are Non-Co-located.

Embodiment 13

Figure 13:
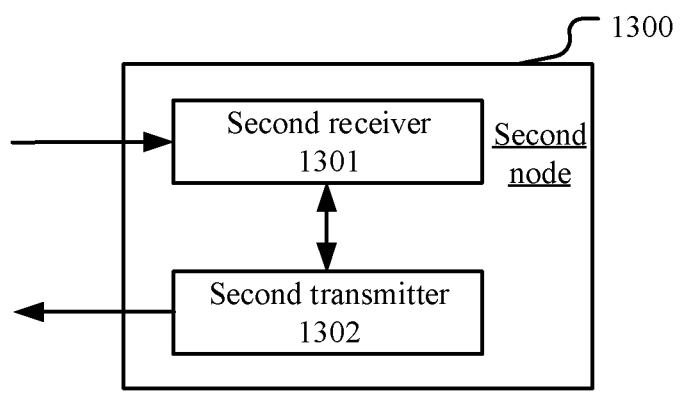
FIG. 13 illustrates a structure block diagram of a processing device in a second node according to one embodiment of the present application.

Embodiment 13 illustrates a structure block diagram of a processing device in a second node according to one embodiment of the present application, as shown in FIG. 13. In FIG. 13, a processing device 1300 in the second node comprises a second receiver 1301 and a second transmitter 1302. The second receiver 1301 comprises at least one of the transmitter/receiver 418B (comprising the antenna 420B), the receiving processor 470B, the multi-antenna receiving processor 472B or the controller/processor 475B in the FIG. 4B of the present application; the second transmitter 1302 comprises at least one of the transmitter/receiver 418B (comprising the antenna 420B), the transmitting processor 416B, the multi-antenna transmitting processor 471B or the controller/processor 475B in the FIG. 4B of the present application.

In Embodiment 13, the second transmitter 1302 transmits a first MAC PDU in a first time unit; herein, the first MAC PDU comprises a first MAC subPDU, the first MAC subPDU comprising a first MAC subheader and a first MAC SDU; the first MAC subheader indicates a first time length; the first time length is used to determine a second time resource pool; a second MAC PDU is transmitted in a second time unit, the second time unit being selected from the second time resource pool; the second MAC PDU comprises at least partial bits in the first MAC SDU; the first time length is dependent on a position of the first time unit.

In one embodiment, the second receiver 1301 selects the first time unit from a first time resource pool; herein, a sum of a duration of the first time resource pool and a duration of the second time resource pool does not exceed a target time length, the target time length being determined in the second node.

In one embodiment, the second receiver 1301 selects the first time unit from a first time resource pool; herein, a sum of a duration of the first time resource pool and a duration of the second time resource pool does not exceed a target time length, the target time length being determined in the second node; a sum of the first time length and a time interval from the first time unit to a time of generating the first MAC SDU is no greater than the target time length.

In one embodiment, the second time resource pool is determined in a lower layer according to the first time length; and the second time resource pool is reported to a higher layer of the first node.

In one embodiment, a time interval from a last time unit in the second time resource pool to a time of receiving the first MAC SDU does not exceed the first time length.

In one embodiment, a first channel connects a transmitter transmitting the first MAC PDU to the first node; the second channel connects the first node to a target receiver receiving the second MAC PDU; the transmitter transmitting the first MAC PDU and the target receiver receiving the second MAC PDU are Non-Co-located.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The first-type communication node or UE or terminal in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The second-type communication node or base station or network-side device in the present application includes but is not limited to macro-cellular base stations, micro-cellular base stations, home base stations, relay base station, eNB, gNB, Transmitter Receiver Point (TRP), relay satellite, satellite base station, airborne base station and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A first node for wireless communications, comprising:
    a first transmitter configured to transmit first assistance information indicating a current transmission state of a first channel connecting the first node to a target receiver and to transmit, to the target receiver, a second media access control packet data unit (MAC PDU) in a first time unit; and
    a first receiver configured:
        to receive first configuration information that was generated in direct response to the first assistance information, the first configuration information indicating a first time length that was dynamically determined based on the current transmission state of the first channel as indicated by the first assistance information,
        to receive, via a second channel, a first MAC PDU, the first MAC PDU comprising a first MAC subPDU, and the first MAC subPDU comprising a first MAC service data unit (SDU), and
        to select the first time unit from a first time resource pool, wherein the first time resource pool is determined according to the first time length, and a time length of the first time resource pool is no greater than the first time length;
    wherein:
        the second MAC PDU comprises at least partial bits in the first MAC SDU; and
        a time interval from a last time unit in the first time resource pool to a time of receiving the first MAC SDU does not exceed the first time length.

2. The first node according to claim 1, wherein a quality of service (Qos) flow to which the first MAC SDU belongs is used to determine a target time length, the first time length being no greater than the target time length.

3. The first node according to claim 1, wherein the first receiver is configured to receive a first threshold, and a difference between the current transmission state of the first channel and a transmission state of the second channel no smaller than the first threshold.

4. The first node according to claim 2, wherein a delay after the first MAC SDU being transmitted through the second channel and the first channel is no greater than the target time length.

5. The first node according to claim 1, wherein the first time unit is any time unit in the first time resource pool and the first time resource pool comprises at least one time unit.

6. A second node for wireless communications, comprising:
    a second receiver configured to receive first assistance information indicating a current transmission state of a first channel; and
    a second transmitter configured:
        to transmit, to a target receiver, first configuration information that was generated in direct response to the first assistance information, the first configuration information indicating a first time length that was dynamically determined based on the current transmission state of the first channel as indicated by the first assistance information,
        to transmit, via a second channel, a first media access control packet data unit (MAC PDU), the first MAC PDU comprising a first MAC subPDU, the first MAC subPDU comprising a first MAC service data unit (SDU),
        to select a first time unit from a first time resource pool, wherein the first time resource pool is determined according to the first time length, and a time length of the first time resource pool is no greater than the first time length, and
        to transmit, to the target receiver, a second MAC PDU in the first time unit;
    wherein:
        the second MAC PDU comprises at least partial bits in the first MAC SDU; and
        a time interval from a last time unit in the first time resource pool to a time of receiving the first MAC SDU does not exceed the first time length.

7. The second node according to claim 6, wherein the second receiver is configured to determine a target time length according to a quality of service (QOS) flow to which the first MAC SDU belongs, the first time length being no greater than the target time length.

8. The second node according to claim 6, wherein the second receiver is configured to receive a first threshold, and a difference between the current transmission state of the first channel and a transmission state of the second channel is no smaller than the first threshold.

9. The second node according to claim 7, wherein a delay after the first MAC SDU being transmitted through the second channel and the first channel is no greater than the target time length.

10. The second node according to claim 6, wherein the first time unit is any time unit in the first time resource pool, and the first time resource pool comprises at least one time unit.

11. A method in a first node for wireless communications, comprising:
    transmitting first assistance information indicating a current transmission state of a first channel;
    receiving first configuration information that was generated in direct response to the first assistance information, the first configuration information indicating a first time length that was dynamically determined based on the current transmission state of the first channel as indicated by the first assistance information;
    receiving a first media access control packet data unit (MAC PDU), the first MAC PDU comprising a first MAC subPDU, the first MAC subPDU comprising a first MAC service data unit (SDU);

selecting a first time unit from a first time resource pool, wherein the first time resource pool is determined according to the first time length, and a time length of the first time resource pool is no greater than the first time length; and transmitting a second MAC PDU in the first time unit;

wherein the second MAC PDU comprises at least partial bits in the first MAC SDU, and a time interval from a last time unit in the first time resource pool to a time of receiving the first MAC SDU does not exceed the first time length.

12. The method in the first node according to claim 11, wherein a quality of service (QOS) flow to which the first MAC SDU belongs is used to determine a target time length, the first time length being no greater than the target time length.

13. The method in the first node according to claim 11, wherein a first threshold is received, with a difference between the transmission state of the first channel and a transmission state of the second channel no smaller than the first threshold.

14. The method in the first node according to claim 12, wherein a delay after the first MAC SDU being transmitted through the second channel and the first channel is no greater than the target time length.

* * * * *